(12) United States Patent
Min et al.

(10) Patent No.: US 12,342,401 B2
(45) Date of Patent: Jun. 24, 2025

(54) ELECTRONIC DEVICE FOR SCHEDULING TRANSMISSION OR RECEPTION OF DATA THROUGH A PLURALITY OF LINKS AND METHOD OF OPERATING THE SAME

(71) Applicant: SAMSUNG ELECTRONICS CO., LTD., Suwon-si (KR)

(72) Inventors: Hyunkee Min, Suwon-si (KR); Moonsoo Kim, Suwon-si (KR); Junghun Lee, Suwon-si (KR); Minsik Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 441 days.

(21) Appl. No.: 17/969,482

(22) Filed: Oct. 19, 2022

(65) Prior Publication Data

US 2023/0136828 A1    May 4, 2023

Related U.S. Application Data

(63) Continuation of application No. PCT/KR2022/014445, filed on Sep. 27, 2022.

(30) Foreign Application Priority Data

Nov. 2, 2021  (KR) .................. 10-2021-0149166
Dec. 22, 2021  (KR) .................. 10-2021-0185419

(51) Int. Cl.
*H04W 76/15*    (2018.01)
*H04L 1/00*    (2006.01)
*H04W 52/02*    (2009.01)

(52) U.S. Cl.
CPC .......... *H04W 76/15* (2018.02); *H04L 1/0003* (2013.01); *H04W 52/0216* (2013.01)

(58) Field of Classification Search
CPC . H04W 76/15; H04W 52/0216; H04W 84/12; H04W 52/0229; H04W 76/28; H04L 1/0003; H04L 1/0001; Y02D 30/70
See application file for complete search history.

(56) References Cited

U.S. PATENT DOCUMENTS

| 10,194,411 B2 | 1/2019 | Shilov et al. |
| 10,517,106 B1 | 12/2019 | Wang et al. |

(Continued)

FOREIGN PATENT DOCUMENTS

| CN | 112135270 A | 12/2020 |
| KR | 10-2015-0128326 | 11/2015 |

(Continued)

OTHER PUBLICATIONS

International Search Report dated Dec. 20, 2022 for PCT/KR2022/014445.

(Continued)

*Primary Examiner* — Walli Z Butt
(74) *Attorney, Agent, or Firm* — Nixon & Vanderhye P.C.

(57) ABSTRACT

An electronic device may include a communication circuit configured to transmit and receive data to and from a first external electronic device through a first link of short-range wireless communication while the electronic device operates in a soft AP mode and to transmit and receive data to and from a second external electronic device through a second link of the short-range wireless communication while the electronic device operates in an STA mode; and a processor, wherein the processor may be configured to identify a control method of the first link and the second link, and to configure at least one parameter related to a period during which data transmission and/or reception through the second link is possible based on at least one parameter related to a period during which data transmission and/or reception through the first link is possible corresponding to identifying (Continued)

that the control method does not simultaneously perform data transmission and/or reception through the first link and the second link. Further, various other embodiments are possible.

20 Claims, 12 Drawing Sheets

(56) References Cited

U.S. PATENT DOCUMENTS

| | | | |
|---|---|---|---|
| 11,032,763 B2 | 6/2021 | Li et al. | |
| 11,166,332 B2 | 11/2021 | Komoriya | |
| 2014/0269473 A1* | 9/2014 | Kondabattini | H04W 52/0209 370/311 |
| 2014/0355527 A1* | 12/2014 | Vaidya | H04W 76/15 370/329 |
| 2017/0064633 A1 | 3/2017 | Jia et al. | |
| 2020/0260513 A1* | 8/2020 | Huang | H04W 4/80 |
| 2020/0260517 A1 | 8/2020 | Huang et al. | |
| 2021/0153294 A1 | 5/2021 | Seo et al. | |
| 2021/0289575 A1 | 9/2021 | Cherian et al. | |
| 2022/0078791 A1 | 3/2022 | Jiang et al. | |
| 2023/0054755 A1* | 2/2023 | Patil | H04W 76/15 |
| 2023/0075274 A1 | 3/2023 | Kamath et al. | |

FOREIGN PATENT DOCUMENTS

| | | |
|---|---|---|
| KR | 10-2020-0095375 | 8/2020 |
| WO | WO 2019/208930 A1 | 10/2019 |
| WO | WO 2020/176831 A1 | 9/2020 |
| WO | WO 2021/183711 A1 | 9/2021 |
| WO | WO 2023/080447 A1 | 5/2023 |

OTHER PUBLICATIONS

Notification of Publication dated May 11, 2023 for PCT/KR2022/014445.

* cited by examiner

ELECTRONIC DEVICE FOR SCHEDULING TRANSMISSION OR RECEPTION OF DATA THROUGH A PLURALITY OF LINKS AND METHOD OF OPERATING THE SAME

CROSS-REFERENCE TO RELATED APPLICATIONS

This application is a continuation of International Application No. PCT/KR2022/014445, filed Sep. 27, 2022, designating the United States, in the Korean Intellectual Property Receiving Office, and claiming priority to Korean Patent Application No. 10-2021-0149166, filed on Nov. 2, 2021, in the Korean Intellectual Property Office, and to Korean Patent Application No. 10-2021-0185419, filed on Dec. 22, 2021, in the Korean Intellectual Property Office, the disclosures of which are all hereby incorporated by reference herein in their entireties.

TECHNICAL FIELD

Various example embodiments relate to an electronic device and/or a method of operating the electronic device, and more particularly for example, to technology for scheduling data transmission and/or reception through a plurality of links.

BACKGROUND

With the spread of various electronic devices, speed improvement for wireless communication that may be used by various electronic devices has been implemented. Among wireless communications supported by recent electronic devices, IEEE 802.11 WLAN (or Wi-Fi) is a standard for implementing high-speed wireless connection on various electronic devices. First implemented Wi-Fi could support a transmission rate of up to 1 to 9 Mbps, but Wi-Fi 6 technology (or IEEE 802.11 ax) can support a transmission rate of up to about 10 Gbps.

An electronic device may support various services (e.g., UHD video streaming service, augmented reality (AR) service, virtual reality (VR) service, and/or a mixed reality (MR) service) using data of a relatively large capacity through wireless communication supporting a high transmission rate.

The IEEE 802.11 ax technical standard introduced a target wake time (TWT) function so as to improve a battery performance of various electronic devices connected to an access point (AP). The TWT function may be a function of transmitting or receiving data between the electronic device and the AP during a designated time (target wake time duration). The electronic device may transmit or receive data during a designated time, and may not transmit or receive data during a time other than the designated time. The TWT function is attracting attention as a function capable of reducing power consumption generating when an electronic device performs short-range wireless communication.

Short-range wireless communication defined in IEEE 802.11 can support various functions (e.g., power management mode or automatic power save delivery (APSD) mode) that can reduce power consumption by performing data transmission and/or reception after transmitting a designated signal in addition to the TWT function.

SUMMARY

An electronic device may perform group owner (GO) negotiation as part of a process of being connected, directly or indirectly, to an external electronic device through short-range wireless communication (e.g., Wi-Fi), and select a channel to be established between the electronic device and the external electronic device based on data exchanged in a negotiation process.

In a state in which the electronic device is connected, directly or indirectly, to an access point (AP), the electronic device may perform GO negotiation with an external electronic device.

In case that the electronic device is connected, directly or indirectly, to an external electronic device through a channel of a frequency band different from a channel between the electronic device and the AP, the electronic device may operate with an AP and then be switched to an STA so as to transmit or receive data to the AP.

In case that the electronic device does not support a function (e.g., real simultaneous dual band (RSDB)) capable of simultaneously performing transmission and/or reception of signals through at least two frequency bands of a plurality of frequency bands, the electronic device may not transmit or receive data simultaneously using a link between the electronic device and the AP and a link between the electronic device and the external electronic device.

In case that scheduling of data transmission and/or reception through a plurality of links is not appropriately performed, the electronic device may be scheduled to perform data transmission and/or reception through another link while performing data transmission and/or reception through one link. In the above situation, the electronic device may not transmit and/or receive data through another link during a time scheduled to transmit and/or receive data through another link, and a situation in which data transmission and/or reception speed is lowered and in which a quality of a service is lowered may occur.

According to various example embodiments, an electronic device may include a communication circuit configured to transmit and receive data to and from a first external electronic device through a first link of short-range wireless communication while the electronic device operates in a soft AP mode and to transmit and receive data to and from a second external electronic device through a second link of the short-range wireless communication while the electronic device operates in an STA mode; and a processor, wherein the processor may be configured to identify a control technique/method of the first link and the second link, and to configure at least one parameter related to a period during which data transmission and/or reception through the second link is available based on at least one parameter related to a period during which data transmission and/or reception through the first link is available corresponding to identifying that the control technique/method does not simultaneously perform data transmission and/or reception through the first link and the second link.

According to various example embodiments, a method of operating an electronic device may include identifying a control method of a first link used for transmitting and receiving data to and from a first external electronic device while the electronic device operates in a soft AP mode and a second link used for transmitting and receiving data to and from a second external electronic device while the electronic device operates in an STA mode; and configuring at least one parameter related to a period during which data transmission and/or reception through the second link is available/possible based on at least one parameter related to a period during which data transmission and/or reception through the first link is available/possible corresponding to identifying that the control method does not simultaneously perform data transmission and/or reception through the first link and the second link.

An electronic device and a method of operating the electronic device according to various example embodiments can configure at least one parameter related to a period during which data transmission and/or reception through the second link is available/possible based on at least one parameter related to a period during which data transmission and/or reception through the first link is available/possible according to identifying that a control technique/method of the first link and the second link does not simultaneously perform data transmission and/or reception through the first link and the second link. In particular, the electronic device can configure at least one parameter related to a period during which data transmission and/or reception through the second link is available/possible so that a period for performing data transmission and/or reception through the first link and a period for performing data transmission and/or reception through the second link do not overlap. Accordingly, the electronic device can prevent, or reduce the likelihood of, a situation scheduled to perform data transmission and/or reception through the second link during a time scheduled to perform data transmission and/or reception through the first link, and improve a data transmission and/or reception speed and improve a service quality.

BRIEF DESCRIPTION OF DRAWINGS

The above and other aspects, features, and advantages of certain embodiments will be more apparent from the following detailed description, taken in conjunction with the accompanying drawings, in which.

DETAILED DESCRIPTION

Figure 1:
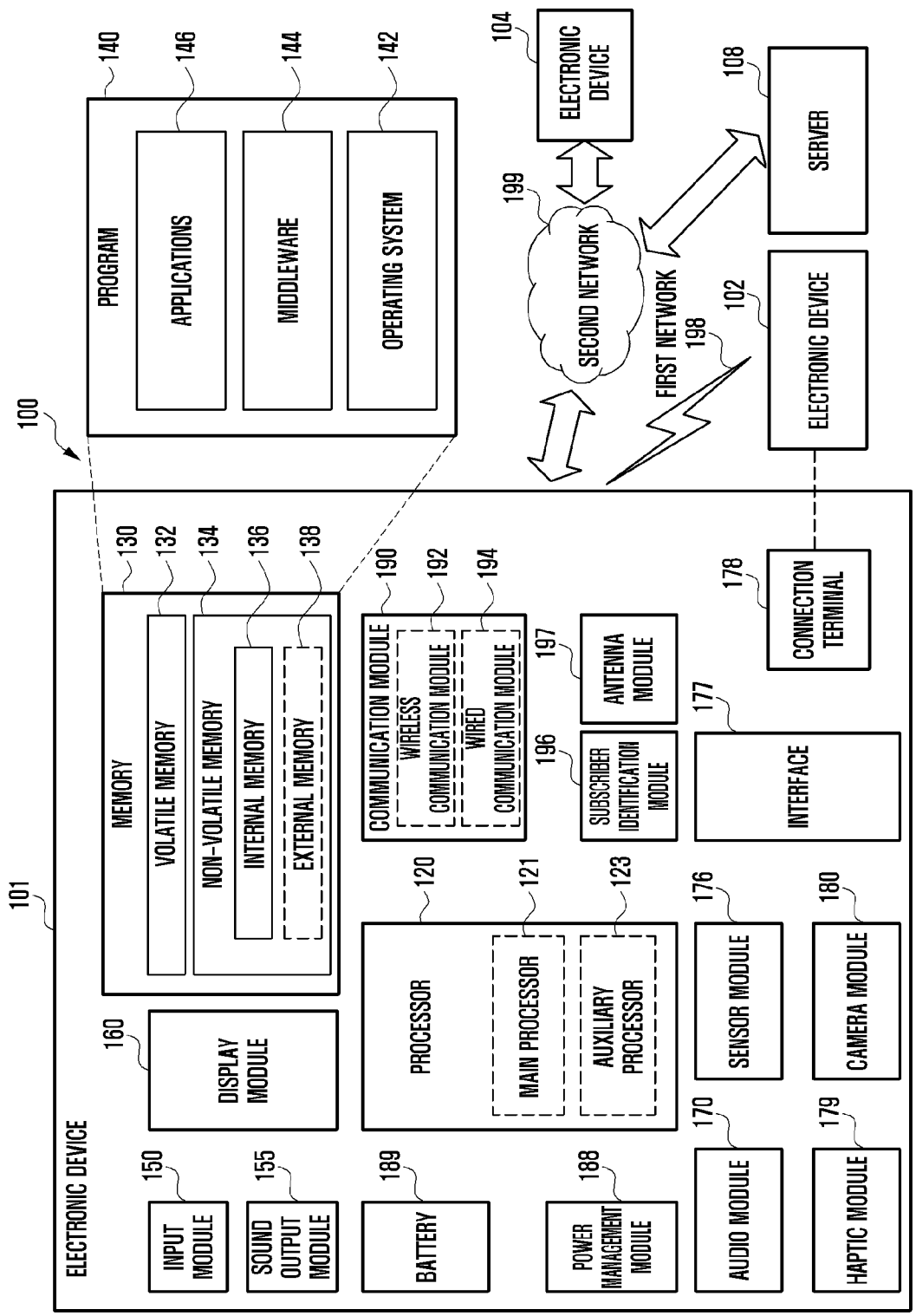
FIG. 1 is a block diagram illustrating an electronic device according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
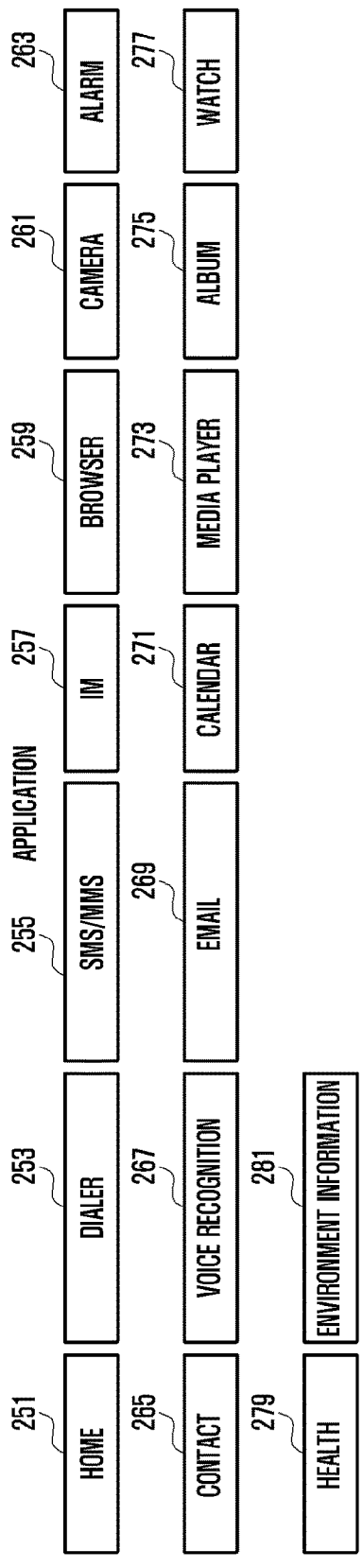
FIG. 2 is a block diagram illustrating a program according to various example embodiments.
Figure 2:
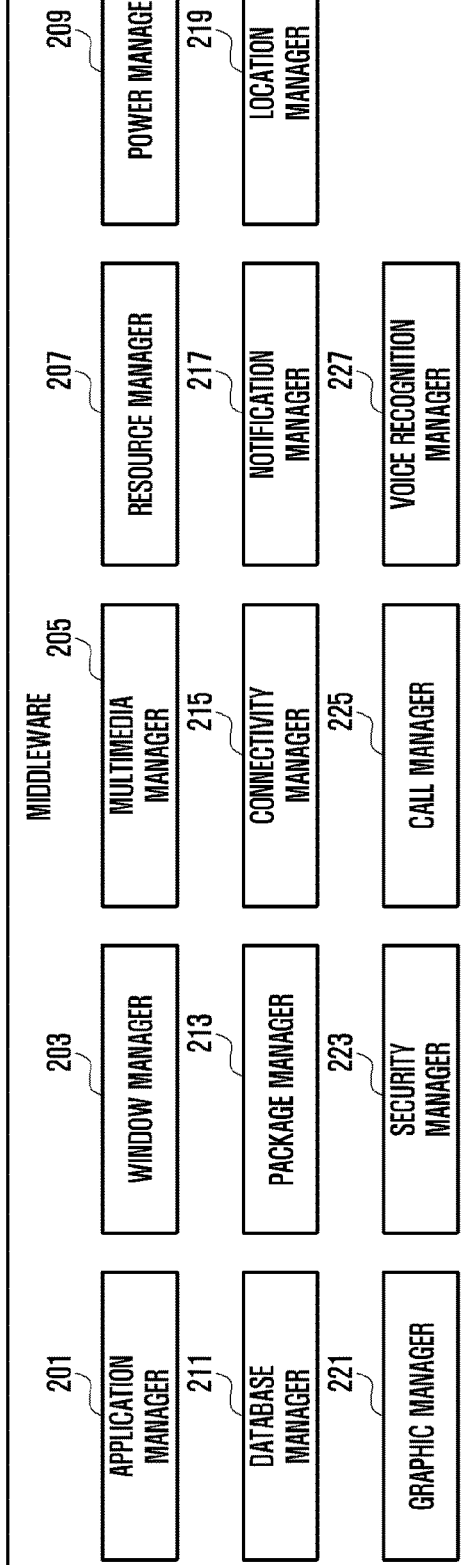

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
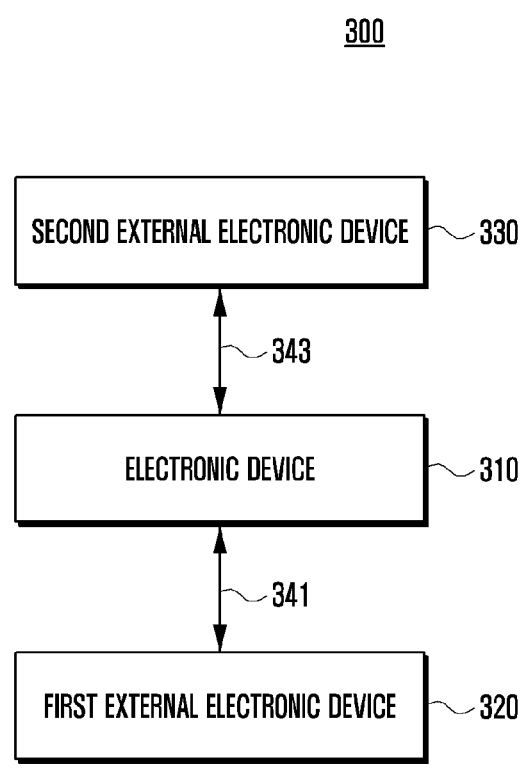
FIG. 3 is a flowchart illustrating an electronic device, a first external electronic device, and a second external electronic device according to various example embodiments.

FIG. 3 is a diagram illustrating an electronic device, a first external electronic device, and a second external electronic device according to various example embodiments.

With reference to FIG. 3, a wireless LAN system 300 shown in FIG. 3 may include an electronic device 310, a first external electronic device 320, and/or a second external electronic device 330. According to an embodiment, the electronic device 310 may perform wireless communication with the second external electronic device 330 through short-range wireless communication. The short-range wireless communication may refer to a communication technique/method that both the electronic device 310 and/or the second external electronic device 330 can support. For example, wireless communication may be Wi-Fi. The second external electronic device 330 may serve as a base station that provides wireless communication to at least one electronic device (e.g., the electronic device 310) positioned inside a communication radius of the wireless LAN system 300. For example, the second external electronic device 330 may include an access point (AP) of IEEE 802.11. The electronic device 310 may include an IEEE 802.11 station (STA). The electronic device 310 may transmit or receive data to and from the second external electronic device 330 through an STA interface implemented therein. The electronic device 310 may operate in an STA mode while transmitting or receiving data to and from the second external electronic device 330.

Short-range wireless communication used by the electronic device 310 and/or the second external electronic device 330 to exchange data may use various frequency bands including a first frequency band (e.g., 2.4 GHz), a second frequency band (e.g., 5 GHz), and/or a third frequency band (e.g., 6 GHz). The electronic device 310 and/or the second external electronic device 330 may establish a channel included in one frequency band of a plurality of frequency bands and exchange data using the established channel.

The electronic device 310 may be connected, directly or indirectly, to the first external electronic device 320 through short-range wireless communication in a state connected, directly or indirectly, to the second external electronic device 330 through short-range wireless communication to transmit data to the first external electronic device 320 or to receive data transmitted by the first external electronic device 320.

The electronic device 310 and the first external electronic device 320 may be directly connected through short-range wireless communication without passing through separate entities (e.g., the second external electronic device 330). The electronic device 310 and the first external electronic device 320 may be connected, directly or indirectly, based on a Wi-Fi direct standard defined by Wi-Fi alliance (WFA).

In order for the electronic device 310 and/or the first external electronic device 320 to be connected, directly or indirectly, to each other through short-range wireless communication, the electronic device 310 and/or the first external electronic device 320 may perform a discovery operation for discovering an electronic device to be connected, a provisioning discovery exchange operation, a provisioning operation and/or a group owner (GO) negotiation operation for determining an electronic device to be a host among the electronic device 310 and/or the first external electronic device 320.

The electronic device 310 may operate as an AP while transmitting or receiving data to or from the first external electronic device 320 through short-range wireless communication, and the first external electronic device 320 may operate as an STA while transmitting or receiving data to or from the electronic device 310 through short-range wireless communication. The electronic device 310 may transmit or receive data to or from the first external electronic device 320 through a soft AP interface implemented on the electronic device 310 while operating in a software enabled access point (soft AP) mode. The soft AP mode may refer to a mode in which a function of an access point of short-range wireless communication is implemented in software and operate.

The electronic device 310 may support various control techniques/methods for controlling a first link 341 between the first external electronic device 320 and the electronic device 310 and a second link 343 between the second external electronic device 330 and the electronic device 310. The electronic device 310 may control the first link 341 and the second link 343 using one of various control techniques/methods.

According to an embodiment, the electronic device 310 may support a function (e.g., real simultaneous dual band (RSDB), dual band simultaneous (DBS)) capable of simultaneously performing transmission and/or reception of signals through at least two frequency bands of a plurality of frequency bands. In case that the electronic device 310 supports an RSDB, the first link 341 used for data exchange between the first external electronic device 320 and the electronic device 310 and the second link 343 used for data exchange between the second external electronic device 330 and the electronic device 310 may have different frequency bands (or different channel numbers). The electronic device 310 may transmit or receive data through the second link 343 while transmitting or receiving data through the first link 341.

According to another embodiment, the electronic device 310 may support a function (e.g., virtual simultaneous dual band (VSDB)) capable of performing transmission and/or reception of signals through at least two frequency bands of a plurality of frequency bands at different times. In case that the electronic device 310 supports a VSDB, the first link 341 used for data exchange between the first external electronic device 320 and the electronic device 310 and the second link 343 used for data exchange between the second external electronic device 330 and the electronic device 310 may have different frequency bands (or different channel numbers). However, the electronic device 310 may not transmit or receive data through a second link 343 while transmitting or receiving data through the first link 341.

According to another embodiment, the electronic device 310 may support a function (e.g., single channel concurrent (SCC)) of transmitting or receiving data to and from external electronic devices (e.g., the first external electronic device 320 and/or the second external electronic device 330) through the same channel. In case that the electronic device 310 supports SCC, the first link 341 used for data exchange between the first external electronic device 320 and the electronic device 310 and the second link 343 used for data exchange between the second external electronic device 330 and the electronic device 310 may have the same channel number. However, the electronic device 310 may not transmit or receive data through the second link 343 while transmitting or receiving data through the first link 341.

When the electronic device 310 performs scheduling of an operation of transmitting and/or receiving data through the first link 341 and the second link 343, the electronic device 310 may support a power management mode and/or a target wake time (TWT). The electronic device 310 may perform different modes for each link. For example, the electronic device 310 may perform scheduling of the first link 341 using the power management mode and perform scheduling of the second link 343 using the TWT. The TWT and power management mode will be described later.

Figure 4A:
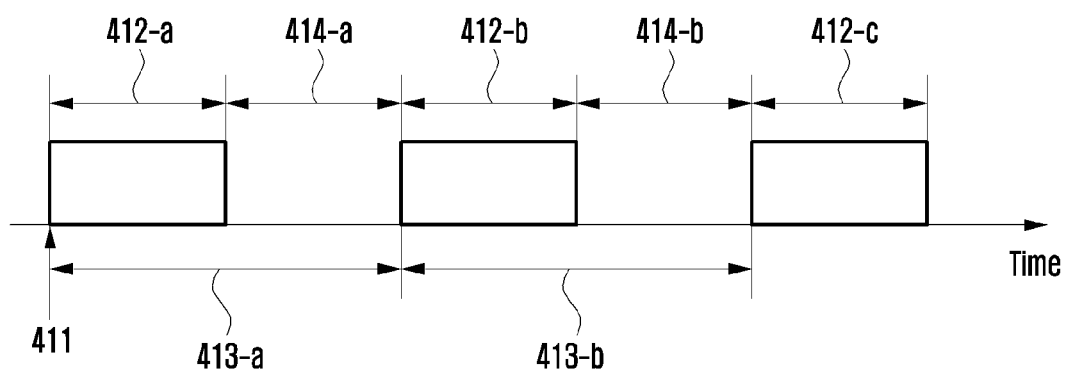
FIG. 4A is a diagram illustrating an embodiment in which an electronic device controls a communication circuit based on a target wake time (TWT) according to various example embodiments.

FIG. 4A is a diagram illustrating an embodiment in which an electronic device controls a communication circuit based on a target wake time (TWT) according to various example embodiments.

The electronic device (e.g., the electronic device 310 of FIG. 3) may support a target wake time (TWT) that receives and/or transmits data every designated time and that does not receive and/or transmit data during other times.

The TWT is a function proposed and implemented in IEEE 802.11 ax (or Wi-Fi 6), and an electronic device supporting the TWT may transmit and/or receive data through short-range wireless communication during a designated time and switch a communication circuit supporting short-range wireless communication to an idle state (e.g., inactive or doze state) during other time except for the designated time, thereby reducing power consumption in performing short-range wireless communication.

The electronic device 310 may activate a TWT function and configure TWT parameters through negotiation with the first external electronic device 320 in a state connected, directly or indirectly, to the first external electronic device 320. The TWT parameters may be parameters required to perform a TWT function. According to an embodiment, the TWT parameters may include at least one of a target wake time 411 indicating an activation time point of data transmission and/or reception, TWT durations (or TWT service period (SP)) 412-a, 412-b, and 412-c indicating a period that may perform data transmission and/or reception, and/or TWT wake intervals 413-a and 413-b indicating an interval between an activation time point of data transmission and/or reception and a next activation time point of data transmission and/or reception.

The first external electronic device 320 may transmit the generated TWT parameter to the electronic device 310 during a negotiation process related to activation of the TWT function. The electronic device 310 may transmit data to the first external electronic device 320 for a specific period (e.g., 412-a, 412-b, and/or 412-c) based on the TWT parameter.

The first external electronic device 320 may transmit data to the electronic device 310 for a specific period (e.g., 412-a, 412-b, and/or 412-c). The first external electronic device 320 may activate a communication circuit (e.g., the wireless communication module 192, comprising communication circuitry, of FIG. 1) for a specific period (e.g., 412-a, 412-b, and/or 412-c), and deactivate the communication circuitry/wireless communication module 192 during another period (e.g., 414-a and/or 414-b), thereby reducing power consumption by the communication module including communication circuitry 192.

Figure 4B:
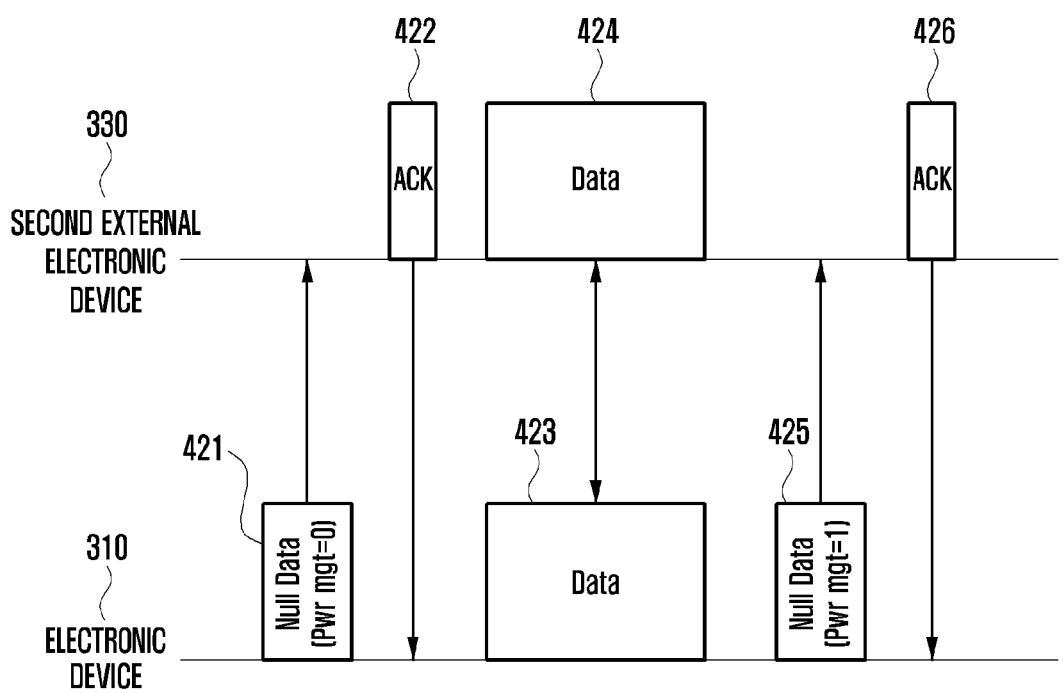
FIG. 4B is a diagram illustrating an embodiment in which an electronic device and a first external electronic device perform a power management mode according to various example embodiments.

FIG. 4B is a diagram illustrating an embodiment in which an electronic device and a first external electronic device perform a power management mode according to various example embodiments.

The electronic device (e.g., the electronic device 310 of FIG. 3) may receive and/or transmit data only in a situation in which there is data to be transmitted or received and support a power management mode that does not receive and/or transmit data during other time.

In a power management mode, when the electronic device 310 transmits a signal instructing to transmit and/or receive data based on existence of data to be transmitted or received and receives a response signal corresponding to the signal from the external electronic device (e.g., the second external electronic device 330 of FIG. 3), power consumption in performing wireless communication may be reduced.

As the electronic device 310 identifies that data to be transmitted and/or received by the electronic device 310 exists, the electronic device 310 operating in the power management mode may transmit a signal 421 (e.g., Null Data in FIG. 4B) indicating that data to be transmitted and/or received by the electronic device 310 exists to the second external electronic device 330 (e.g., see FIG. 4B).

A signal indicating that data to be transmitted or received by the electronic device 310 exists may be implemented in the form of a null data packet (NDP) defined in IEEE 802.11, and the NDP may include a field (e.g., PWR MGT) indicating whether data to be transmitted or received by the electronic device 310 exists. A value (e.g., 0) of a field indicating whether data to be transmitted or received by the electronic device 310 exists in case that data to be transmitted or received by the electronic device 310 exists and a value (e.g., 1) of a field indicating whether data to be transmitted or received by the electronic device 310 exist in case that data to be transmitted or received by the electronic device 310 does not exist may be different from each other.

As shown in FIG. 4B, the second external electronic device 330 may transmit a response signal 422 corresponding to receiving the signal 421 indicating that data to be transmitted and/or received by the electronic device 310 exists.

After receiving the response signal 422 (e.g., ACK), the electronic device 310 that has received the response signal 422 may transmit data 423 to the second external electronic device 330 and/or may receive data 424 transmitted by the second external electronic device 330.

As the electronic device 310 identifies that data to be transmitted or received by the electronic device 310 does not exist, the electronic device 310 may transmit a signal 425 (e.g., Null Data in FIG. 4B) indicating that data to be transmitted or received by the electronic device 310 does not exist to the second external electronic device 330. The second external electronic device 330 may receive a signal 425 indicating that data to be transmitted or received by the electronic device 310 does not exist and transmit a response signal 426 (e.g., ACK in FIG. 4B).

The electronic device 310 may maintain the communication circuit (e.g., the communication circuit 192 of FIG. 1) in an active state only from a time point of transmission of a signal indicating that data to be transmitted or received by the electronic device 310 exist to a time point of reception of a response signal 426 corresponding to a signal 425 indicating that data to be transmitted or received by the electronic device 310 does not exist and deactivate the communication module comprising communication circuitry 192 for other period, thereby reducing power consumption by the communication circuit 192.

Figure 4C:
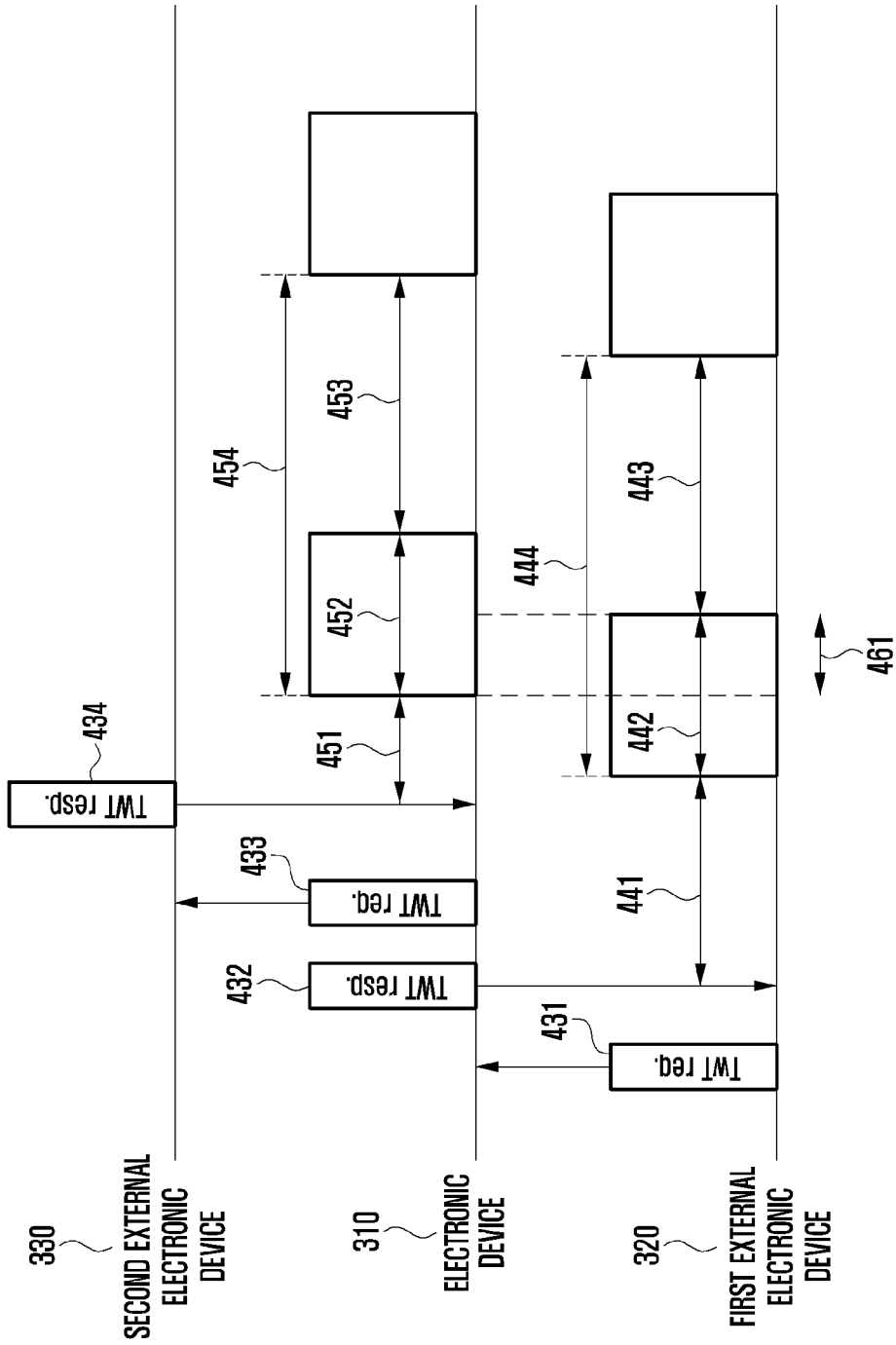
FIG. 4C is a diagram illustrating an embodiment in which an electronic device and a first external electronic device perform a TWT operation according to various example embodiments.

FIG. 4C is a diagram illustrating an embodiment in which an electronic device and a first external electronic device perform a TWT operation according to various example embodiments.

In a state in which the first external electronic device 320 is connected, directly or indirectly, to the electronic device (e.g., the electronic device 310 of FIG. 3) through a first link (e.g., the first link 341 of FIG. 3), the first external electronic device 320 may activate a TWT function and configure TWT parameters through negotiation with the electronic device 310. In order to activate the TWT function, the first external electronic device 320 may transmit a TWT request message 431 requesting TWT negotiation to the electronic device 310. The TWT request message 431 may include TWT parameters generated by the first external electronic device 320. The TWT parameters may be parameters required to perform a TWT function. According to an embodiment, the TWT parameters may include at least one of a target wake time 441 indicating an activation time point of data transmission and/or reception, TWT duration (or TWT service period (SP)) 442 indicating a period that may perform data transmission and/or reception, and/or a TWT wake interval 444 indicating an interval between an activation time point of data transmission and/or reception and a next activation time point of data transmission and/or reception.

The electronic device 310 may receive the TWT request message 431, modify (or maintain) the TWT parameter included in the TWT request message 431, and transmit a TWT response message 432 including the modified TWT parameter (or the same TWT parameter as that included in the TWT request message 431) to the first external electronic device 320.

The first external electronic device 320 may perform a TWT operation based on the TWT parameter included in the TWT response message 432.

The first external electronic device 320 may transmit data to the electronic device 310 for a specific period 442. The first external electronic device 320 may activate a communication circuit (e.g., the wireless communication module 192, comprising communication circuitry, of FIG. 1) for a specific period 442, and deactivate the communication circuit 192 during another period 443, thereby reducing power consumption by the communication circuit 192.

In a state in which the electronic device 310 is connected, directly or indirectly, to the second external electronic device (e.g., the second external electronic device 330 of FIG. 3) through the second link (e.g., the second link 343 of FIG. 3), the electronic device 310 may activate a TWT function through negotiation with the second external electronic device 330 and configure TWT parameters. The electronic device 310 may operate as an STA while performing short-range wireless communication with the second external electronic device 330. In order to activate the TWT function, the electronic device 310 may transmit a TWT request message 433 requesting TWT negotiation to the second external electronic device 330. The TWT request message 433 may include TWT parameters generated by the electronic device 310. The TWT parameters may be parameters required to perform a TWT function. According to an embodiment, the TWT parameters may include at least one of a target wake time 451 indicating an activation time point of data transmission and/or reception, TWT duration (or TWT service period (SP)) 452 indicating a period that may perform data transmission and/or reception, and/or a TWT wake interval 454 indicating an interval between an activation time point of data transmission and/or reception and a next activation time point of data transmission and/or reception.

The second external electronic device 330 may receive the TWT request message 433, modify (or maintain) the TWT parameter included in the TWT request message 433, and transmit a TWT response message 434 including the modified TWT parameter (or the same TWT parameter as that included in the TWT request message 433) to the electronic device 310.

The electronic device 310 may perform an operation based on the TWT parameter included in the TWT response message.

The electronic device 310 may transmit data to the second external electronic device 330 for a specific period 452. The electronic device 310 may activate a communication circuit (e.g., the wireless communication module 192 of FIG. 1) for a specific period 452, and deactivate the wireless communication module including wireless communication circuitry 192 during other period 453, thereby reducing power consumption by the communication circuit 192.

The electronic device 310 may not support simultaneous transmission and/or reception of data through the first link 341 and the second link 343 due to a performance problem thereof. For example, the electronic device 310 may not support an RSDB, but may support a VSDB or SCC. In this case, the electronic device 310 may perform transmission and/or reception of data to and/or from the first external electronic device 320 through the first link 341, and then perform transmission and/or reception of data to and/or from the second external electronic device 330 through the second link 343.

With reference to FIG. 4C and time 461, a time 442 at which data transmission and/or reception is performed through the first link 341 and a time (e.g., specific period) 452 at which data transmission and/or reception is performed through the second link 343 is performed may overlap during a partial period 451. As a length of the partial period 451 increases, a situation in which latency of data transmission and/or reception of the electronic device 310, the first external electronic device 320, and/or the second external electronic device 330 increases may occur.

Hereinafter, an embodiment of performing scheduling of the first link 341 and/or the second link 343 in order to reduce an overlapping time of a time in which the electronic device 310 transmits and/or receives data through the first link 341 and a time in which the electronic device 310 transmits and/or receives data through the second link 343 will be described. Each embodiment herein may be used in combination with any other embodiment described herein.

Figure 5:
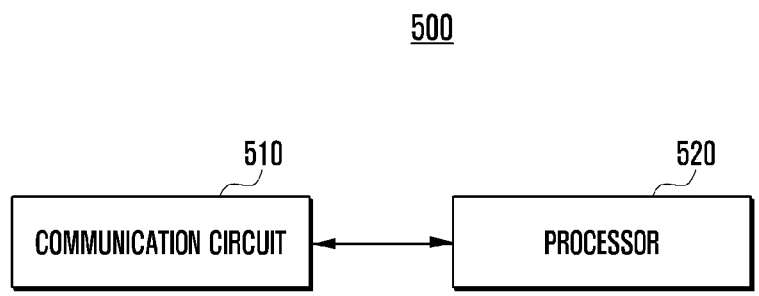
FIG. 5 is a block diagram illustrating an electronic device according to various example embodiments.

FIG. 5 is a block diagram illustrating an electronic device according to various example embodiments.

According to various example embodiments, an electronic device 500 (e.g., the electronic device 300 of FIG. 3) may include a communication circuit 510 (e.g., the wireless communication module 192 of FIG. 1) and/or a processor 520 (e.g., the processor 120 of FIG. 1).

The communication circuit 510 may include various circuit structures used for modulation and/or demodulation of a signal in the electronic device 500. For example, the communication circuit 510 may modulate a signal of a baseband to a signal of a radio frequency (RF) band so as to output the signal of a baseband through an antenna (not illustrated) or may demodulate a signal of an RF band received through the antenna to the signal of a baseband to transmit the demodulated signal to the processor 520.

The communication circuit 510 may be connected, directly or indirectly, to a first external electronic device (e.g., the first external electronic device 320 of FIG. 3) through the first link (e.g., the first link 341 of FIG. 3) to transmit or receive data. The electronic device 500 may operate as an AP while transmitting or receiving data to and from the first external electronic device 320 through short-range wireless communication, and the first external electronic device 320 may operate as an STA while transmitting or receiving data to or from the electronic device 310 through short-range wireless communication. The electronic device 500 may transmit or receive data to or from the first external electronic device 320 through a soft AP interface implemented on the electronic device 500 while operating in a software enabled access point (soft AP) mode. The soft AP mode may refer to a mode in which a function of an access point of short-range wireless communication is implemented in software and operate.

The communication circuit 510 may be connected, directly or indirectly, to the second external electronic device (e.g., the second external electronic device 330 of FIG. 3) through the second link (e.g., the second link 343 of FIG. 3) to transmit or receive data. The electronic device 500 may operate as an STA while transmitting or receiving data to or from the second external electronic device 330 through short-range wireless communication, and the second external electronic device 330 may operate as an AP while transmitting or receiving data to or from the electronic device 500 through short-range wireless communication.

The processor 520 may perform an operation of generating a packet for receiving data transmitted by the application processor (e.g., the processor 120 of FIG. 1) and transmitting the received data to the first external electronic device 320. The processor 520 may be a communication processor (or communication processor) included in a communication module (e.g., the wireless communication module 192 of FIG. 1). Each "module" herein may comprise circuitry.

FIG. 5 illustrates that one processor 520 is implemented, but the number of processors 520 may be the plural. In case that the electronic device 500 supports a function (e.g., real simultaneous dual band (RSDB), dual band simultaneous (DBS)) capable of simultaneously performing transmission and/or reception of signals through at least two frequency bands of a plurality of frequency bands, the processor 520 may be implemented in the plural. For example, the electronic device 500 may include a first processor (not illustrated) for processing data transmitted or received through the first link (e.g., the first link 341 of FIG. 3) between the first external electronic device (e.g., the first external electronic device 320 of FIG. 3) and the electronic device 500 and a second processor for processing data transmitted or received through the second link (e.g., the second link 343 of FIG. 3) between the second external electronic device (e.g., the second external electronic device 330 of FIG. 3) and the electronic device 500. Each processor herein comprises processing circuitry.

However, in case that the electronic device 500 does not support a function (e.g., real simultaneous dual band (RSDB), dual band simultaneous (DBS)) capable of simultaneously performing transmission and/or reception of signals through at least two frequency bands of a plurality of frequency bands, the processor 520 may be implemented as one. The processor 520, comprising processing circuitry, may control the communication circuit 510 to transmit or receive data through different links according to various techniques/methods (e.g., VSDB and SCC). For example, the processor 520 may control the communication circuit 510 to transmit or receive data through the first link 341 during a first time, and control the communication circuit 510 to transmit or receive data through the second link 343 during a second time. However, it may be recognized that other entities implemented on an upper layer (e.g., framework layer or application layer) of a layer (e.g., hardware layer) that processes data transmission and/or reception support a function in which the electronic device 500 can simultaneously perform transmission and/or reception of signals through at least two frequency bands of a plurality of frequency bands.

According to an embodiment, the processor 520 may generate a packet by performing channel coding based on data transmitted by the application processor (e.g., the application processor 120 of FIG. 1), identify whether there is an error in at least a part of data transmitted by the external electronic device 320, or in case that an error occurs, the processor 520 may perform an error recovery operation (e.g., automatic repeat request (ARQ) or hybrid automatic repeat request (HARD)).

The processor 520 may be operatively connected, directly or indirectly, to the communication circuit 510 to control an operation of the communication circuit 510. The processor 520 may perform scheduling of data transmission and/or reception through the first link (e.g., the first link 341 of FIG. 3) between the first external electronic device (e.g., the first external electronic device 320 of FIG. 3) and the electronic device 500 and/or the second link (e.g., the second link 343 of FIG. 3) between the second external electronic device (e.g., the second external electronic device 330 of FIG. 3) and the electronic device 500. Scheduling of the first link 341 and/or the second link 343 may include an operation of determining a time to perform data transmission and/or reception through the first link 341 and/or the second link 343 and/or an operation of determining a time to perform data transmission and/or reception through the second link 343.

The processor 520 may support a target wake time (TWT) function as part of an operation of performing scheduling of the first link 341 and/or the second link 343. The TWT function may indicate that data transmission and/or reception is performed during a designated time, and that data transmission and/or reception is not performed during an undesignated time.

The processor 520 may perform a TWT negotiation with the first external electronic device 320 so as to support a target wake time (TWT) function. The processor 520 may receive TWT parameters generated by the first external electronic device 320 during the TWT negotiation process. Alternatively, the processor 520 may generate TWT parameters to be used by the first external electronic device 320.

According to an embodiment, the processor 520 may generate TWT parameters based on a state of the electronic device 500 and/or a state of the first external electronic device 320. The state of the electronic device 500 may include at least one of a size of data (or traffic) to be transmitted or received by the electronic device 500, a quality of service (QoS) requirement, or a contention level of a channel to be created between the electronic device 500 and/or the first external electronic device 320. The state of the first external electronic device 320 may include at least one of a size of data (or traffic) to be transmitted or received by the first external electronic device 320, a quality of service (QoS) requirement, or a contention level of a channel to be created between the electronic device 500 and/or the first external electronic device 320.

The processor 520 may receive and/or generate a TWT parameter including at least one of a target wake time (e.g., 411 of FIG. 4A) indicating an activation time point of data transmission and/or reception, TWT duration (e.g.: 412-*a*, 412-*b*, and 412-*c* of FIG. 4A) indicating a period that may perform data transmission and/or reception, and/or a TWT wake interval (e.g., 413-*a* and 413-*b* of FIG. 4A) indicating an interval between an activation time point of data transmission and/or reception and a next activation time point of data transmission and/or reception.

For example, the processor 520 may receive and/or generate TWT duration having a relatively large length and/or a TWT wake interval having a relatively small length based on performing a service requiring relatively high-capacity data transmission and relatively low latency. Alternatively, the processor 520 may receive and/or generate TWT duration having a relatively small length and/or a TWT wake interval having a relatively long length based on performing a service that does not require relatively small capacity data transmission and relatively low latency.

The processor 520 may perform an operation based on the TWT parameter included in the TWT response message. The processor 520 may control the communication circuit 510 to transmit data to the first external electronic device 320 during TWT durations 442. The processor 520 may not transmit data to the first external electronic device 320 during communication deactivation periods 443 of the first external electronic device 320.

The processor 520 may perform scheduling of the first link 341 so as to transmit and/or receive data to the first external electronic device 320 during the TWT durations 442.

The processor 520 may support a power management mode (hereinafter, PMM) (or automatic power save delivery (APSD) function) as part of an operation of performing scheduling of the first link 341 and/or the second link 343. The PMM function or the APSD function may indicate a mode in which the electronic device 500 transmits a signal instructing to perform transmission and/or reception of data based on existence of data to be transmitted or received and in which the electronic device 500 transmits or receives data when receiving a response signal corresponding to the signal from the second external electronic device 330. The electronic device 500 supporting the power management mode may switch the communication circuit 510 supporting short-range wireless communication to an idle state (e.g., inactive or doze state) in a situation in which data transmission and/or reception is not performed, thereby reducing power consumption in performing short-range wireless communication.

The electronic device 500 operating in the power management mode may transmit, to the second electronic device 330, a signal (e.g., 421 of FIG. 4B) indicating that data to be transmitted or received by the electronic device 500 exists according to identifying that the electronic device 500 satisfies a designated condition (e.g., a condition in which data to be transmitted or received exists and/or a condition in which the electronic device 500 is switched from an inactive state to an active state).

A signal indicating that data to be transmitted or received by the electronic device 500 exists may be implemented in the form of a null data packet (NDP) defined in IEEE 802.11, and the NDP may include a field (e.g., PWR MGT) indicating whether data to be transmitted or received by the electronic device 500 exists. A value (e.g., 0) of a field indicating whether data to be transmitted or received by the electronic device 500 exists in case that data to be transmitted or received by the electronic device 500 exists and a value (e.g., 1) of a field indicating whether data to be transmitted or received by the electronic device 500 exists in case that data to be transmitted or received by the electronic device 500 does not exist may be different from each other.

The second external electronic device 330 may transmit a response signal (e.g., 422 of FIG. 4B) corresponding to receiving the signal 421 indicating that data to be transmitted or received by the electronic device 310 exists.

After receiving the response signal 422, the electronic device 500 that has received the response signal 422 may transmit data (e.g., 423 of FIG. 4B) to the second external electronic device 330 and/or may receive data (e.g., 424 of FIG. 4B) transmitted by the second external electronic device 330.

As the electronic device 500 identifies that data to be transmitted or received by the electronic device 500 does not exist, the electronic device 500 may transmit a signal (e.g., 425 of FIG. 4B) indicating that data to be transmitted or received by the electronic device 500 does not exist to the second external electronic device 330. The second external electronic device 330 may receive a signal indicating that data to be transmitted or received by the electronic device 500 does not exist and transmit a response signal 426.

The electronic device 500 may perform scheduling of the second link 343 so as to transmit or receive data from a reception time point of the response signal 422 corresponding to the signal 421 indicating that data to be transmitted or received by the electronic device 500 exists to a time point transmitting the signal 425 indicating that data to be transmitted or received by the electronic device 500 does not exist.

In the above-described embodiment, it is described that a TWT function is used for performing scheduling of the first link 341 and a PMM (or APSD) function is used for performing scheduling of the second link 343, but there is no limitation on a function to be used for performing the scheduling of the first link 341 and/or the second link 343. For example, the electronic device 500 may perform scheduling of the first link 341 using a PMM (or APSD) function and perform scheduling of the second link 343 using a TWT function. As another example, the electronic device 500 may perform scheduling of the first link 341 and/or the second link 343 using the TWT function. As another example, the electronic device 500 may perform scheduling of the first link 341 and/or the second link 343 using a PMM (or APSD) function.

The electronic device 500 may not support simultaneous transmission and/or reception of data through the first link 341 and the second link 343 due to a performance problem thereof. For example, the electronic device 500 may not support an RSDB, but may support a VSDB or SCC. In this case, the electronic device 500 may not perform data transmission and/or reception to and/or from the second external electronic device 330 through the second link 343 while performing data transmission and/or reception to and/or from the first external electronic device 320 through the first link 341. Hereinafter, an embodiment in which scheduling of the first link 341 and/or the second link 343 is performed will be described in consideration of the above problems.

The processor 520 may identify a control technique/method of the first link 341 and/or the second link 343. The control technique/method of the first link 341 and/or the second link 343 may be one of an RSDB, VSDB, and/or SCC. The processor 520 may identify whether the control technique/method of the first link 341 and/or the second link 343 may simultaneously perform an operation of transmitting and/or receiving data through the first link 341 and an operation of transmitting and/or receiving data through the second link 343.

According to an embodiment, the electronic device 500 may control the first link 341 and/or the second link 343 using a function (e.g., real simultaneous dual band (RSDB)) capable of simultaneously performing transmission and/or reception of signals through at least two frequency bands of a plurality of frequency bands. In case that the electronic device 500 supports an RSDB, the first link 341 used for data exchange between the first external electronic device 320 and the electronic device 500 the second link 343 used for data exchange between the second external electronic device 330 and the electronic device 500 may have different frequency bands (or different channel numbers). The electronic device 500 may transmit or receive data through the second link 343 while transmitting or receiving data through the first link 341. The processor 520 may determine that the control technique/method of the first link 341 and/or the second link 343 may simultaneously perform an operation of transmitting and/or receiving data through the first link 341 and an operation of transmitting and/or receiving data through the second link 343.

According to another embodiment, even if the electronic device 500 supports an RSDB, the processor 520 may determine that an operation of transmitting and/or receiving data through the first link 341 and an operation of transmitting and/or receiving data through the second link 343 may not be simultaneously performed corresponding to identifying that a difference between a frequency band of the first link 341 and/or a frequency band of the second link 343 is less than or equal to a designated value. A situation in which the frequency band of the first link 341 and/or the frequency band of the second link 343 is less than or equal to a designated value may indicate a situation in which a signal transmitted or received through the first link 341 acts as interference to interrupt transmission and/or reception of a signal through the second link 343.

According to another embodiment, the electronic device 500 may control the first link 341 and/or the second link 343 using a function (e.g., virtual simultaneous dual band (VSDB)) capable of performing transmission and/or reception of signals through at least two frequency bands of a plurality of frequency bands at different times. In case that the electronic device 500 supports the VSDB, the first link 341 used for data exchange between the first external electronic device 320 and the electronic device 500 and the second link 343 used for data exchange between the second external electronic device 330 and the electronic device 500 may have different frequency bands (or different channel numbers). However, the electronic device 500 may not transmit or receive data through the second link 343 while transmitting or receiving data through the first link 341. The processor 520, comprising processing circuitry, may determine that the control technique/method of the first link 341 and/or the second link 343 may not simultaneously perform an operation of transmitting and/or receiving data through the first link 341 and an operation of transmitting and/or receiving data through the second link 343.

According to another embodiment, the electronic device 500 may control the first link 341 and/or the second link 343 using a function (e.g., single channel concurrent (SCC)) of transmitting or receiving data to or from external electronic devices (e.g., the first external electronic device 320 and/or the second external electronic device 330) through the same channel. In case that the electronic device 500 supports SCC, the first link 341 used for data exchange between the first external electronic device 320 and the electronic device 500 and the second link 343 used for data exchange between the second external electronic device 330 and the electronic device 500 may have the same channel number. However, the electronic device 310 may not transmit or receive data through the second link 343 while transmitting or receiving data through the first link 341. The processor 520 may determine that the control technique/method of the first link 341 and/or the second link 343 may not simultaneously perform an operation of transmitting and/or receiving data through the first link 341 and an operation of transmitting and/or receiving data through the second link 343.

The processor 520 may configure at least one parameter related to a period during which data transmission and/or reception through the second link 343 is available/possible based on at least one parameter related to a period during which data transmission and/or reception through the first link 341 is available/possible corresponding to identifying that the control technique/method of the first link 341 and/or the second link 343 does not simultaneously perform data transmission and/or reception through the first link 341 and the second link 343.

As part of an operation of performing scheduling of data transmission and/or reception through the second link 343, the processor 520 may configure at least one parameter related to a period during which data transmission and/or reception through the second link 343 is available/possible so that a period during which data transmission and/or reception through the first link 341 is available/possible and a period during which data transmission and/or reception through the second link 343 is available/possible do not overlap (or so that a length of an overlapping period is less than or equal to a designated size). The electronic device 500 does not simultaneously perform an operation of transmitting and/or receiving data through the first link 341 and an operation of transmitting and/or receiving data through the second link 343 through the above method, thereby reducing latency of data transmission and/or reception.

The parameter related to a period during which data transmission and/or reception through the first link 341 is available/possible may include a TWT parameter in case that the first link 341 performs a TWT. The TWT parameter may include at least one of a target wake time (e.g., 411 of FIG. 4A) indicating an activation time point of data transmission and/or reception, TWT duration (e.g., 412-*a*, 412-*b*, and 412-*c* of FIG. 4A) indicating a period that may perform data transmission and/or reception, and/or a TWT wake interval (e.g., 413-*a* and 413-*b* of FIG. 4A) indicating an interval between an activation time point of data transmission and/or reception and a next activation time point of data transmission and/or reception.

The processor 520 may receive a TWT request message transmitted by the first external electronic device 320, and identify parameters related to a period during which data transmission and/or reception through the first link 341 is available/possible based on the TWT parameter included in the TWT request message.

Alternatively, the processor 520 may determine (or generate) TWT parameters based on characteristics of the first link 341 (e.g., a bandwidth of the first link 341, the number of spatial streams of the first link 341, and/or an MCS level of data to be transmitted through the first link 341) and a size of data to be transmitted through the first link 341 and/or a size of data to be received through the first link 341.

For example, the first external electronic device 320 may be an electronic device (e.g., AR glasses) that receives image data from the electronic device 500 and that displays the image data, and it is assumed that the electronic device 500 transmits one frame during the TWT duration (e.g., 412-*a*, 412-*b*, and 412-*c* of FIG. 4A). The processor 520 may identify characteristics of the first link 341 (e.g., a bandwidth of the first link 341 (e.g., a bandwidth of 160 MHz defined in IEEE 802.11ax), the number (e.g., 2) of streams of the first link 341, and an MCS level (e.g., MCS 11) of the first link 341), and determine a network link bandwidth (e.g., 1800 Mbps) of the first link 341 based on the characteristics of the first link 341. The processor 520 may determine a size (1 ms) of the TWT duration based on a value obtained by dividing a size (e.g., 1.8 Mbits) of data to be transmitted or received through the first link 341 during one TWT duration by the network link bandwidth (e.g., 1800 Mbps) of the first link 341. The processor 520 may determine the TWT interval (e.g., 45 fps/1 sec=22.2 ms) based on a frame rate (e.g., 45 fps) of the first external electronic device 320. In addition to the examples described above, the processor 520 may determine TWT parameters based on characteristics of the first link 341 and performance information of the first external electronic device 320 (e.g., a frame rate of the first external electronic device 320).

In case that the TWT is performed through the first link 341 and the second link 343, as part of a scheduling operation of the second link 343, the processor 520 may configure an TWT interval and the TWT duration of the second link 343 so that the TWT duration of the first link 341 and the TWT duration of the second link 343 do not overlap each other (or so that a length of an overlapping period is less than or equal to a designated length).

In case that the processor 520 performs a TWT through the first link 341 and operates in a PMM (or APSD) mode through the second link 343, as part of a scheduling operation of the second link 343, the processor 520 may control the communication circuit 510 to transmit a signal (e.g., 421 of FIG. 4B) instructing to perform data transmission and/or reception through the second link 343 so that a period during which data transmission and/or reception through the first link 341 is available/possible and a period during which data transmission and/or reception through the second link 343 is available/possible do not overlap (or so that a length of an overlapping period is equal to or less than a designated size).

After the TWT duration of the first link 341 ends, the processor 520 may transmit a signal 421 instructing to perform data transmission and/or reception through the second link 343 to the second external electronic device 330. As the processor 520 receives a response signal (e.g., 421 of FIG. 4B) corresponding to the signal 421, the processor 520 may transmit data to the second external electronic device 330 or may receive data transmitted by the second external electronic device 330 through the second link 343. The processor 520 may transmit a signal (e.g., 425 of FIG. 4B) to end data transmission and/or reception through the second link 343 before the next TWT duration of the first link 341 begins, and as the processor 520 receives the response signal (e.g., 426 of FIG. 4B), the processor 520 may end data transmission and/or reception through the second link 343. The processor 520 may receive or transmit data from or to the first external electronic device 320 through the first link 341 according to the start of the TWT duration of the first link 341. Through the above technique/method, it is available/possible to prevent or reduce an increase in latency caused by overlapping times for transmitting or receiving data through the first link 341 and/or the second link 343.

In case that the processor 520 transmits and/or receives data through the second link 343 using an APSD mode, the processor 520 may transmit a signal 421 including information indicating a period during which data transmission and/or reception through the second link 343 is available/possible to the second external electronic device 330. The signal 421 including information indicating a period during which data transmission and/or reception through the second link 343 is available/possible may be implemented in the form of a trigger frame in the APSD.

During the TWT duration of the first link 341, as the processor 520 identifies that there is no data to be transmitted or received through the first link 341 (or data transmission and/or reception has been completed through the first link 341), the processor (e.g., transmits an early termination signal to the first external electronic device 320) 520 may perform at least one operation for ending a period for performing data transmission and/or reception through the first link 341, and transmit a signal 421 instructing to perform data transmission and/or reception through the second link 343 to the second external electronic device 330. As the processor 520 receives a response signal (e.g., 421 of FIG. 4B) corresponding to the signal 421, the processor 520 may transmit data to the second external electronic device 330 or may receive data transmitted by the second external electronic device 330 through the second link 343.

Figure 6:
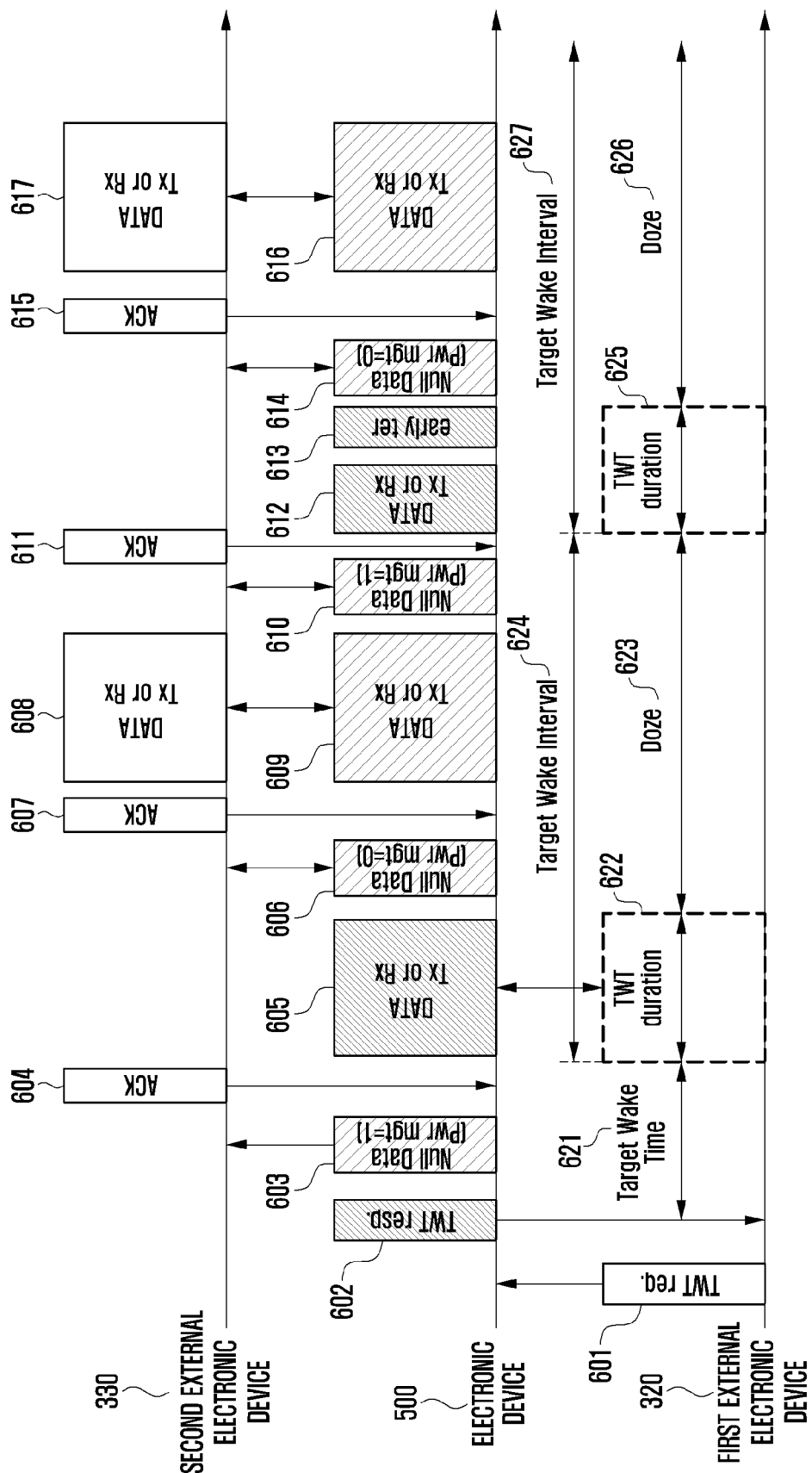
FIG. 6 is a diagram illustrating an embodiment in which an electronic device schedules transmission and/or reception of data through a first link and/or a second link while operating in a power management mode according to various example embodiments.

FIG. 6 is a diagram illustrating an embodiment in which an electronic device schedules transmission and/or reception of data through a first link and/or a second link while operating in a power management mode according to various example embodiments.

The electronic device (e.g., the electronic device 500 of FIG. 5) may identify a control technique/method of a first link (e.g., the first link 341 of FIG. 3) and/or a second link (e.g., the second link 343 of FIG. 3). The control technique/method of the first link 341 and/or the second link 343 may be one of an RSDB, VSDB, and/or SCC. The electronic device 500 may identify whether the control technique/method of the first link 341 and/or the second link 343 may simultaneously perform an operating of transmitting and/or receiving data through the first link 341 and an operating of transmitting and/or receiving data through the second link 343.

According to an embodiment, the electronic device 500 may control the first link 341 and/or the second link 343 using a function (e.g., real simultaneous dual band (RSDB)) capable of simultaneously performing transmission and/or reception of signals through at least two frequency bands of a plurality of frequency bands. In case that the electronic device 500 supports an RSDB, the first link 341 used for data exchange between the first external electronic device 320 and the electronic device 500.

The second link 343 used for data exchange between the second external electronic device 330 and the electronic device 500 may have different frequency bands (or different channel numbers). The electronic device 500 may transmit or receive data through the second link 343 while transmitting or receiving data through the first link 341. The electronic device 500 may determine that the control technique/method of the first link 341 and/or the second link 343 may simultaneously perform an operation of transmitting and/or receiving data through the first link 341 and an operating of transmitting and/or receiving data through the second link 343.

According to another embodiment, even if the electronic device 500 supports an RSDB, the electronic device 500 may determine that an operation of transmitting and/or receiving data through the first link 341 and an operation of transmitting and/or receiving data through the second link 343 may not be simultaneously performed corresponding to identifying that a frequency band of the first link 341 and/or a frequency band of the second link 343 are/is less than or equal to a designated value. A situation in which a frequency band of the first link 341 and/or a frequency band of the second link 343 are/is less than or equal to a designated value may indicate a situation in which a signal transmitted or received through the first link 341 acts as interference to interrupt transmission and/or reception of a signal through the second link 343.

According to another embodiment, the electronic device 500 may control the first link 341 and/or the second link 343 using a function (e.g., virtual simultaneous dual band (VSDB)) capable of performing transmission and/or reception of signals through at least two frequency bands of a plurality of frequency bands at different times. In case that the electronic device 500 supports the VSDB, the first link 341 used for data exchange between the first external electronic device 320 and the electronic device 500 and the second link 343 used for data exchange between the second external electronic device 330 the electronic device 500 may have different frequency bands (or different channel numbers). However, the electronic device 500 may not transmit or receive data through the second link 343 while transmitting or receiving data through the first link 341. The electronic device 500 may determine that the control technique/method of the first link 341 and/or the second link 343 may not perform simultaneously an operation of transmitting and/or receiving data through the first link 341 and an operation of transmitting and/or receiving data through the second link 343.

According to another embodiment, the electronic device 500 may control the first link 341 and/or the second link 343 using a function (e.g., single channel concurrent (SCC)) of transmitting or receiving data to or from external electronic devices (e.g., the first external electronic device 320 and/or the second external electronic device 330) through the same channel. In case that the electronic device 500 supports SCC, the first link 341 used for data exchange between the first external electronic device 320 and the electronic device 500 and the second link 343 used for data exchange between the second external electronic device 330 and the electronic device 500 may have the same channel number. However, the electronic device (e.g., 310) may not transmit or receive data through the second link 343 while transmitting or receiving data through the first link 341. The electronic device 500 may determine that the control technique/method of the first link 341 and/or the second link 343 may not perform simultaneously an operation of transmitting and/or receiving data through the first link 341 and an operation of transmitting and/or receiving data through the second link 343.

The electronic device 500 may configure at least one parameter related to a period during which data transmission and/or reception through the second link 343 is available/possible based on at least one parameter related to a period during which data transmission and/or reception through the first link 341 is available/possible corresponding to identifying that the control technique/method of the first link 341 and/or the second link 343 does not simultaneously perform data transmission and/or reception data through the first link 341 and the second link 343.

The parameter related to a period during which data transmission and/or reception through the first link 341 is available/possible may include a TWT parameter in case that the first link 341 performs a TWT. The TWT parameter may include at least one of a target wake time 621 indicating an activation time point of data transmission and/or reception, TWT durations 622 and 625 indicating a period that may perform data transmission and/or reception, and/or data transmission and/or TWT wake intervals 624 and 627 indicating an interval between an activation time point of data transmission and/or reception and a next activation time point of data transmission and/or reception.

The electronic device 500 may receive a TWT request message 601 transmitted by the first external electronic device 320 and identify a parameter related to a period during which data transmission and/or reception through the first link 341 is available/possible based on the TWT parameter included in the TWT request message 601. The electronic device 500 may identify (or change) a parameter related to a period during which data transmission and/or reception through the first link 341 is available/possible and transmit a TWT response message 602 to the first external electronic device 320 through the first link 341.

In case that the electronic device 500 performs a TWT through the first link 341 and operates in a PMM (or APSD) mode through the second link 343, as part of a scheduling operation of the second link 343, the electronic device 500 may enable a period during which data transmission and/or reception through the first link 341 is available/possible and a period during which data transmission and/or reception through the second link 343 is available/possible not to overlap (or so that a length of an overlapping period is equal to or less than a designated size).

After transmitting the TWT response message 602, the electronic device 500 may transmit a signal 603 instructing not to perform data transmission and/or reception through the second link 343 to the second external electronic device 330 through the second link 343. The electronic device 500 may receive a response message 604 transmitted through the second link 343 and transmit data 605 to the first external electronic device 310 through the first link 341 or may receive data 605 from the first external electronic device 310 during TWT duration 622.

After the TWT duration 622 ends, the electronic device 500 may control the communication circuit 510 to transmit, to the second external electronic device 330, a signal 606 indicating to transmit and/or receive data through the second link 343 while the first link 341 remains an idle (e.g., inactive or doze) state 623. As the electronic device 500 receives a response signal 607 corresponding to the signal 606, the electronic device 500 may transmit data 609 to the second external electronic device 330 or may receive data 608 transmitted by the second external electronic device 330 through the second link 343.

As the electronic device 500 transmits a signal 610 ending data transmission and/or reception through the second link 343 and receives a response signal 611 (e.g., ACK in FIG. 6) before the next TWT duration 625 of the first link 341 begins, the electronic device 500 may terminate data transmission and/or reception through the second link 343.

The electronic device 500 may receive or transmit data 612 from or to the first external electronic device 320 through the first link 341 according to the start of the TWT duration 625 of the first link 341.

During the TWT duration 625 of the first link 341, as the electronic device 500 identifies that there is no data 612 to be transmitted or received through the first link 341 (or transmission and/or reception of data 612 is completed through the first link 341), the electronic device 500 may perform at least one operation (e.g., transmit an early termination signal 613 to the first external electronic device 320) for ending a period for performing data transmission and/or reception through the first link 341 and transmit a signal 614 instructing to perform data transmission and/or reception through the second link 343 to the second external electronic device 330. As the processor 520 receives a response signal 615 corresponding to the signal 614, the processor 520 may transmit data 616 to the second external electronic device 330 or may receive data 617 transmitted by the second external electronic device 330 through the second link 343, e.g., during idle state (e.g., doze) 626.

Through the above technique/method, it is available/possible to prevent or reduce an increase in latency caused by overlapping times for transmitting or receiving data through the first link 341 and/or the second link 343.

Figure 7:
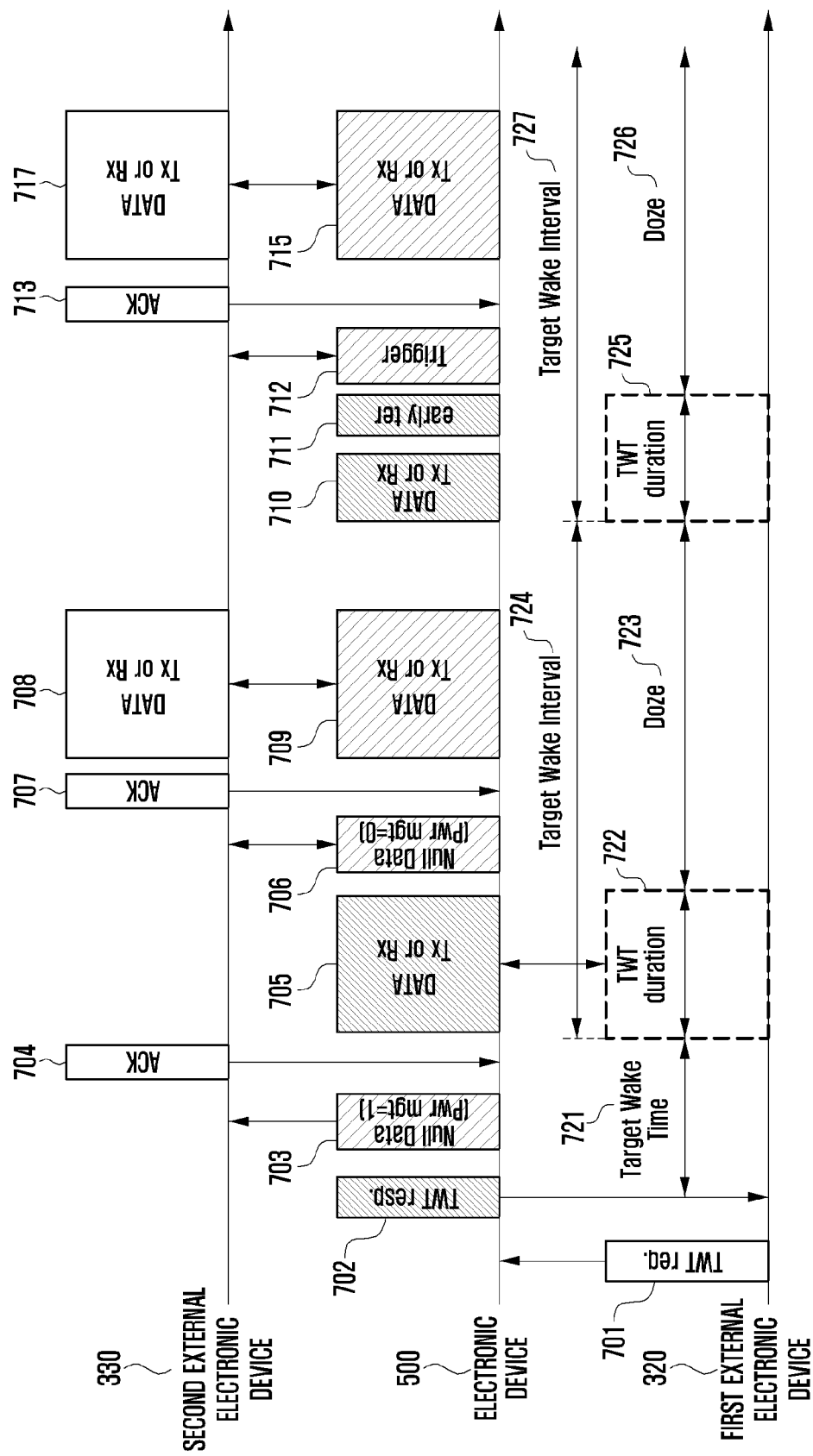
FIG. 7 is a diagram illustrating an embodiment in which an electronic device schedules transmission and/or reception of data through a first link and/or a second link while operating in a power save mode according to various example embodiments.

FIG. 7 is a diagram illustrating an embodiment in which an electronic device schedules transmission and/or reception of data through a first link and/or a second link while operating in an automatic power save delivery (APSD) mode according to various example embodiments.

The electronic device (e.g., the electronic device 500 of FIG. 5) may identify a control technique/method of a first link (e.g., the first link 341 of FIG. 3) and/or a second link (e.g., the second link 343 of FIG. 3). The control technique/method of the first link 341 and/or the second link 343 may be one of an RSDB, VSDB, and/or SCC. The electronic device 500 may identify whether the control technique/method of the first link 341 and/or the second link 343 may simultaneously perform an operation of transmitting and/or receiving data through the first link 341 and an operation of transmitting and/or receiving data through the second link 343.

The electronic device 500 may configure at least one parameter related to a period during which data transmission and/or reception through the second link 343 is available/possible based on at least one parameter related to a period during which data transmission and/or reception through the first link 341 is available/possible corresponding to identifying that the control technique/method of the first link 341 and/or the second link 343 does not simultaneously perform data transmission and/or reception through the first link 341 and the second link 343.

The parameter related to a period during which data transmission and/or reception through the first link 341 is possible may include a TWT parameter in case that the first link 341 performs a TWT. The TWT parameter may include at least one of a target wake time 721 indicating an activation time point of data transmission and/or reception, TWT durations 722 and 725 indicating a period that may perform data transmission and/or reception, and/or data transmission, and/or TWT wake intervals 724 and 727 indicating an interval between an activation time point of data transmission and/or reception and a next activation time point of data transmission and/or reception.

The electronic device 500 may receive a TWT request message 701 transmitted by the first external electronic device 320 and identify a parameter related to a period during which data transmission and/or reception through the first link 341 is possible based on the TWT parameter included in the TWT request message 701. The electronic device 500 may identify (or change) a parameter related to a period during which data transmission and/or reception through the first link 341 is possible and transmit a TWT response message 702 to the first external electronic device 320 through the first link 341.

In case that the electronic device 500 performs a TWT through the first link 341 and operates in an APSD mode through the second link 343, as part of a scheduling operation of the second link 343, the electronic device 500 may enable a period during which data transmission and/or reception through the first link 341 is possible and a period during which data transmission and/or reception through the second link 343 is possible not to overlap (or so that a length of an overlapping period is less than or equal to a designated size).

After transmitting the response message 702, the electronic device 500 may transmit a signal 703 instructing not to perform data transmission and/or reception through the second link 343 to the second external electronic device 330 through the second link 343. The electronic device 500 may receive a response message 704 transmitted through the second link 343, and transmit data 705 to the first external electronic device 320 through the first link 341 and/or receive data 705 from the first external electronic device 320 during TWT duration 722.

The electronic device 500 may control the communication circuit 510 to transmit a signal 706 instructing to perform data transmission and/or reception through the second link 343 to the second external electronic device 330 while the first link 341 maintains an idle (e.g., doze) state 723 after the TWT duration 722 ends. As the electronic device 500 receives a response signal 707 corresponding to the signal 706, the electronic device 500 may transmit data 709 to the second external electronic device 330 or may receive data 708 transmitted by the second external electronic device 330 through the second link 343.

In case that the electronic device 500 transmits and/or receives data through the second link 343 using the APSD mode, the electronic device 500 may transmit a signal 706 including information indicating a period 723 in which data transmission and/or reception through the second link 343 is possible to the second external electronic device 330. The signal 706 including information indicating a period during which data transmission and/or reception through the second link 343 is possible may be implemented in the form of a trigger frame in the APSD.

The electronic device 500 may end data transmission and/or reception through the second link 343 before the next TWT duration 725 of the first link 341 begins.

The electronic device 500 may receive or transmit data 710 from or to the first external electronic device 320 through the first link 341 according to the start of the TWT duration 725 of the first link 341.

During the TWT duration 725 of the first link 341, as the electronic device 500 identifies that there is no data 710 to be transmitted or received through the first link 341 (or transmission and/or reception of data 710 is completed through the first link 341), the electronic device 500 may perform at least one operation (e.g., transmit an early termination signal 711 to the first external electronic device 320) for ending a period for performing data transmission and/or reception through the first link 341 and transmit a signal 712 instructing to perform data transmission and/or reception through the second link 343 to the second external electronic device 330. As the processor 520 receives a response signal 713 corresponding to the signal 712, the processor 520 may transmit data 715 to the second external electronic device 330 and/or may receive data 717 transmitted by the second external electronic device 330 through the second link 343.

Through the above technique/method, it is possible to prevent or reduce an increase in latency caused by overlapping times for transmitting or receiving data through the first link 341 and/or the second link 343.

Figure 8:
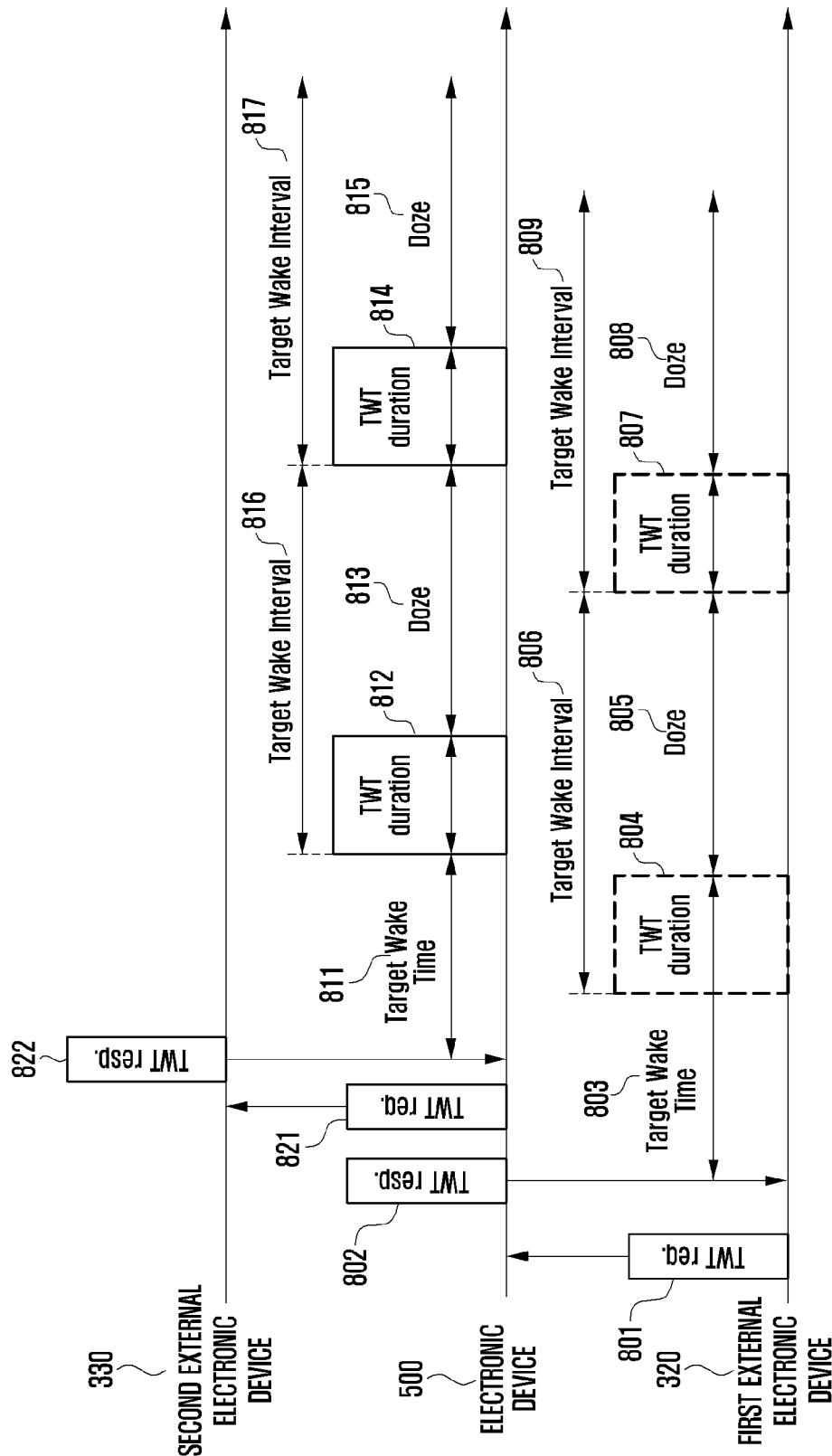
FIG. 8 is a diagram illustrating an embodiment in which an electronic device schedules transmission and/or reception of data through a first link and/or a second link while operating in a target wake time (TWT) mode according to various example embodiments.

FIG. 8 is a diagram illustrating an embodiment in which an electronic device schedules transmission and/or reception of data through a first link and/or a second link while operating in a target wake time (TWT) mode according to various example embodiments.

The electronic device (e.g., the electronic device 500 of FIG. 5) may identify a control technique/method of a first link (e.g., the first link 341 of FIG. 3) and/or a second link (e.g., the second link 343 of FIG. 3). The control technique/method of the first link 341 and/or the second link 343 may be one of an RSDB, VSDB, and/or SCC. The electronic device 500 may identify whether the control technique/method of the first link 341 and/or the second link 343 may simultaneously perform an operation of transmitting and/or receiving data through the first link 341 and an operation of transmitting and/or receiving data through the second link 343.

The electronic device 500 may configure at least one parameter related to a period during which data transmission and/or reception through the second link 343 is possible based on at least one parameter related to a period during which data transmission and/or reception through the first link 341 is possible corresponding to identifying that the control technique/method of the first link 341 and/or the second link 343 does not simultaneously perform data transmission and/or reception through the first link 341 and the second link 343.

The parameter related to a period during which data transmission and/or reception through the first link 341 is possible may include a TWT parameter in case that the first link 341 performs a TWT. The TWT parameter may include at least one of a target wake time 803 indicating an activation time point of data transmission and/or reception, TWT durations 804 and 807 indicating a period that may perform data transmission and/or reception, and/or TWT wake intervals 806 and 809 indicating an interval between an activation time point of data transmission and/or reception and a next activation time point of data transmission and/or reception. TWT wake interval 806, 816, 809, 817 may include idle state 805, 808, 813, 815.

The electronic device 500 may receive a TWT request message 801 transmitted by the first external electronic device 320, and identify a parameter related to a period during which data transmission and/or reception through the first link 341 is possible based on the TWT parameter included in the TWT request message 801. The electronic device 500 may identify (or change) a parameter related to a period during which data transmission and/or reception through the first link 341 is possible, and transmit a TWT response message 802 to the first external electronic device 320 through the first link 341.

In case that the electronic device 500 performs a TWT through the first link 341 and the second link 343, as part of a scheduling operation of the second link 343, the electronic device 500 may configure a target wake time 811 so that the target wake time 811 of the second link 343 does not occur within the TWT durations 804 and 807 of the first link 341. The electronic device 500 may configure the TWT durations 804 and 807 and TWT intervals 816 and 817 of the second link 343 so that the TWT durations 804 and 807 of the first link 341 and TWT durations 812 and 814 of the second link 343 do not overlap each other (or so that a length of an overlapping period is less than or equal to a designated length).

After transmitting the response message 802, the electronic device 500 may transmit a TWT request message 821 including TWT parameters of the second link 343 to the second external electronic device 330 through the second link 343. The electronic device 500 may perform a TWT operation of the second link 343 according to reception of a response message 822 corresponding to the TWT request message 821.

The electronic device 500 may transmit or receive data to or from the first external electronic device 320 through the first link 341 during the TWT duration 804. The electronic device 500 may transmit or receive data to or from the second external electronic device 330 through the second link 343 during the TWT duration 812 of the second link 343 started after the TWT duration 804 of the first link 341 ends. With reference to FIG. 8, it may be identified that the TWT duration 812 of the second link 343 does not overlap the TWT duration 804 of the first link 341.

The electronic device 500 may transmit or receive data to or from the first external electronic device 320 through the first link 341 during the TWT duration 807 of the first link 341 started after the TWT duration 812 of the second link 343 ends. The electronic device 500 may transmit or receive data to or from the second external electronic device 330 through the second link 343 during the TWT duration 814 of the second link 343 started after the TWT duration 807 of the first link 341 ends. With reference to FIG. 8, it may be 45 identified that the TWT duration 814 of the second link 343 does not overlap the TWT duration 807 of the first link 341.

Through the above method, it is possible to prevent or reduce the likelihood of an increase in latency caused by overlapping times for transmitting or receiving data through the first link 341 and/or the second link 343.

An electronic device according to various example embodiments may include a communication circuit configured to transmit and receive data to and from a first external electronic device through a first link of short-range wireless communication while the electronic device operates in a soft AP mode and to transmit and receive data to and from a second external electronic device through a second link of the short-range wireless communication while the electronic device operates in an STA mode; and a processor, wherein the processor may be configured to identify a control technique/method of the first link and the second link, and to configure at least one parameter related to a period during which data transmission and/or reception through the second link is possible based on at least one parameter related to a period during which data transmission and/or reception through the first link is possible corresponding to identifying that the control technique/method does not simultaneously perform data transmission and/or reception through the first link and the second link.

In the electronic device according to various example embodiments, the processor may configure at least one parameter related to a period during which data transmission and/or reception through the second link is possible so that a period for performing data transmission and/or reception through the first link and a period for performing data transmission and/or reception through the second link do not overlap.

In the electronic device according to various example embodiments, in case that the processor performs a target wake time (TWT) through the second link, the processor may configure TWT duration and a TWT interval so that a period for performing data transmission and/or reception through the first link and the TWT duration do not overlap.

In the electronic device according to various example embodiments, in case that the processor operates in a power management mode or an automatic power save delivery (APSD) mode through the second link, the processor may be configured to transmit a signal instructing to perform data transmission and/or reception through the second link so that a period for performing data transmission and/or reception through the first link and a period for performing data transmission and/or reception through the second link do not overlap.

In the electronic device according to various example embodiments, the processor may be configured to transmit a signal instructing to complete data transmission and/or reception through the second link before a period for performing data transmission and/or reception through the first link begins.

In the electronic device according to various example embodiments, the processor may be configured to perform at least one operation for ending a period performing data transmission and/or reception through the first link and transmit a signal instructing to perform data transmission and/or reception through the second link corresponding to completion of data transmission and/or reception through the first link during a period performing data transmission and/or reception through the first link.

In the electronic device according to various example embodiments, a signal instructing to perform data transmission and/or reception through the second link may include length information of a period during which data transmission and/or reception is performed through the second link.

In the electronic device according to various example embodiments, the processor may be configured to determine at least one parameter related to a period during which data transmission and/or reception through the first link is possible based on a size of data transmitted or received from the first external electronic device and/or a modulation and coding scheme (MCS) of the first link.

In the electronic device according to various example embodiments, the processor may identify a difference between a frequency band of the first link and a frequency band of the second link corresponding to identifying that the control method simultaneously performs data transmission and/or reception through the first link and the second link, and configure at least one parameter related to a period during which data transmission and/or reception through the second link is possible based on at least one parameter related to a period during which data transmission and/or reception through the first link is possible corresponding to identifying that the difference is greater than or equal to a designated value.

In the electronic device according to various example embodiments, the control method of the first link and the second link may include one control method of a real simultaneous dual band (RSDB), virtual simultaneous dual band (VSDB), and/or single channel concurrent (SCC).

In the electronic device according to various example embodiments, the processor may be a processor implemented in the communication circuit.

In the electronic device according to various example embodiments, the processor may be an application processor.

Figure 9:
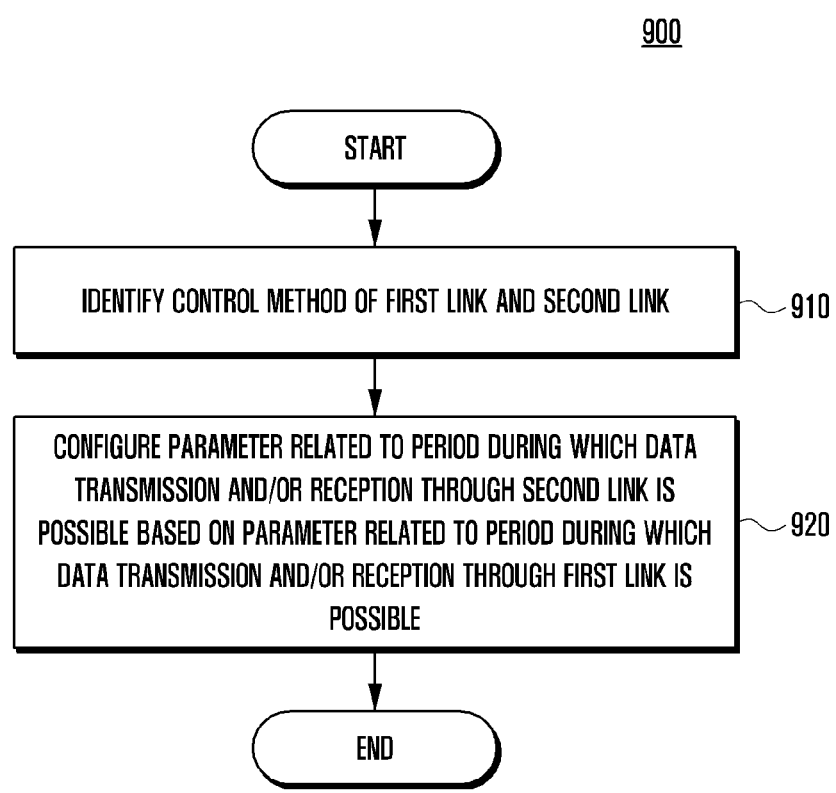
FIG. 9 is a flowchart illustrating a method of operating an electronic device according to various example embodiments.

FIG. 9 is a flowchart illustrating a method 900 of operating an electronic device according to various example embodiments.

In operation 910, the electronic device (e.g., the electronic device 500 of FIG. 5) may identify a control method of the first link (e.g., the first link 341 of FIG. 3) and/or the second link (e.g., the second link 343 of FIG. 3).

The control method of the first link 341 and/or the second link 343 may be one of an RSDB, VSDB, and/or SCC. The electronic device 500 may identify whether the control method of the first link 341 and/or the second link 343 may simultaneously perform an operation of transmitting and/or receiving data through the first link 341 and an operation of transmitting and/or receiving data through the second link 343.

According to an embodiment, the electronic device 500 may control the first link 341 and/or the second link 343 using a function (e.g., real simultaneous dual band (RSDB)) capable of simultaneously performing transmission and/or reception of signals through at least two frequency bands of a plurality of frequency bands. In case that the electronic device 500 supports an RSDB, the first link 341 used for data exchange between the first external electronic device 320 and the electronic device 500 and the second link 343 used for data exchange between the second external electronic device 330 and the electronic device 500 may have different frequency bands (or different channel numbers). The electronic device 500 may transmit or receive data through the second link 343 while transmitting or receiving data through the first link 341. The electronic device 500 may determine that the control method of the first link 341 and/or the second link 343 may simultaneously perform an operation of transmitting and/or receiving data through the first link 341 and an operation of transmitting and/or receiving data through the second link 343.

According to another embodiment, even if the electronic device 500 supports an RSDB, the electronic device 500 may determine that an operation of transmitting and/or receiving data through the first link 341 and an operation of transmitting and/or receiving data through the second link 343 may not be simultaneously performed corresponding to identifying that a frequency band of the first link 341 and/or a frequency band of the second link 343 are/is less than or equal to a designated value. A situation in which the frequency band of the first link 341 and/or the frequency band of the second link 343 are/is less than or equal to a designated value may indicate a situation in which a signal transmitted or received through the first link 341 acts as interference to interrupt transmission and/or reception of a signal through the second link 343.

According to another embodiment, the electronic device 500 may control the first link 341 and/or the second link 343 using a function (e.g., virtual simultaneous dual band (VSDB)) capable of performing transmission and/or reception of signals through at least two frequency bands of a plurality of frequency bands at different times. In case that the electronic device 500 supports the VSDB, the first link 341 used for data exchange between the first external electronic device 320 and the electronic device 500 and the second link 343 used for data exchange between the second external electronic device 330 and the electronic device 500 may have different frequency bands (or different channel numbers). However, the electronic device 500 may not transmit or receive data through the second link 343 while transmitting or receiving data through the first link 341. The electronic device 500 may determine that the control method of the first link 341 and/or the second link 343 may not perform simultaneously an operation of transmitting and/or receiving data through the first link 341 and an operation of transmitting and/or receiving data through the second link 343.

According to another embodiment, the electronic device 500 may control the first link 341 and/or the second link 343 using a function (e.g., single channel concurrent (SCC)) of transmitting or receiving data to and from external electronic devices (e.g., the first external electronic device 320 and/or the second external electronic device 330) through the same channel. In case that the electronic device 500 supports SCC, the first link 341 used for data exchange between the first external electronic device 320 and the electronic device 500 and the second link 343 used for data exchange between the second external electronic device 330 and the electronic device 500 may have the same channel number. However, the electronic device 310 may not transmit or receive data through the second link 343 while transmitting or receiving data through the first link 341. The electronic device 500 may determine that the control method of the first link 341 and/or the second link 343 may not perform simultaneously an operation of transmitting and/or receiving data through the first link 341 and an operation of transmitting and/or receiving data through the second link 343.

In operation 920, the electronic device 500 may configure at least one parameter related to a period during which data transmission and/or reception through the second link 343 is possible based on at least one parameter related to a period during which data transmission and/or reception through the first link 341 is possible corresponding to identifying that the control method of the first link 341 and/or the second link 343 does not perform simultaneously data transmission and/or reception through the first link 341 and the second link 343.

As part of an operation of scheduling data transmission and/or reception through the second link 343, the electronic device 500 may configure at least one parameter related to a period during which data transmission and/or reception through the second link 343 is possible so that a period during which data transmission and/or reception through the first link 341 is possible and a period during which data transmission and/or reception through the second link 343 is possible do not overlap (or so that a length of an overlapping period is less than or equal to a designated size). The electronic device 500 does not simultaneously perform an operation of transmitting and/or receiving data through the first link 341 and an operation of transmitting and/or receiving data through the second link 343 through the above method, thereby reducing latency of data transmission and/or reception.

The parameter related to a period during which data transmission and/or reception through the first link 341 is possible may include a TWT parameter in case that the first link 341 performs a TWT. The TWT parameter may include at least one of a target wake time (e.g., 411 of FIG. 4A) indicating an activation time point of data transmission and/or reception, TWT duration (e.g., 412-*a*, 412-*b*, and 412-*c* of FIG. 4A) indicating a period that may perform data transmission and/or reception, and/or a TWT wake interval (e.g., 413-*a* and 413-*b* of FIG. 4A) indicating an interval between an activation time point of data transmission and/or reception and a next activation time point of data transmission and/or reception.

The electronic device 500 may receive a TWT request message transmitted by the first external electronic device 320, and identify parameters related to a period during which data transmission and/or reception through the first link 341 is possible based on the TWT parameter included in the TWT request message.

Alternatively, the electronic device 500 may determine (or generate) the TWT parameter based on characteristics of the first link 341 (e.g., a bandwidth of the first link 341, the number of spatial streams of the first link 341, and/or an MCS level of data to be transmitted through the first link 341), a size of data to be transmitted through the first link 341, and a size of data to be received through the first link 341.

In case that the electronic device 500 performs a TWT through the first link 341 and the second link 343, as part of a scheduling operation of the second link 343, the electronic device 500 may configure TWT duration and a TWT interval of the second link 343 so that TWT duration of the first link 341 and TWT duration of the second link 343 do not overlap each other (or so that a length of an overlapping period is less than or equal to a designated length).

In case that the electronic device 500 performs a TWT through the first link 341 and operates in a PMM (or APSD) mode through the second link 343, as part of a scheduling operation of the second link 343, the electronic device 500 may control the communication circuit 510 to transmit a signal (e.g., 421 of FIG. 4B) instructing to perform data transmission and/or reception through the second link 343 so that a period during which data transmission and/or reception through the first link 341 is possible and a period during which data transmission and/or reception through the second link 343 is possible do not overlap (or so that a length of an overlapping period is less than or equal to a designated length).

After the TWT duration of the first link 341 ends, the electronic device 500 may transmit a signal 421 instructing to perform data transmission and/or reception through the second link 343 to the second external electronic device 330. As the electronic device 500 receives a response signal (e.g., 421 of FIG. 4B) corresponding to the signal 421, the electronic device 500 may transmit data to the second external electronic device 330 or may receive data transmitted by the second external electronic device 330 through the second link 343. Before next TWT duration of the first link 341 begins, as the electronic device 500 transmits a signal (e.g., 425 of FIG. 4B) ending data transmission and/or reception through the second link 343 and receives a response signal (e.g., 426 of FIG. 4B), the electronic device 500 may end data transmission and/or reception through the second link 343. The electronic device 500 may receive or transmit data from or to the first external electronic device 320 through the first link 341 according to the start of TWT duration of the first link 341. Through the above method, it is possible to prevent or reduce an increase in latency caused by overlapping times for transmitting or receiving data through the first link 341 and/or the second link 343.

Figure 10:
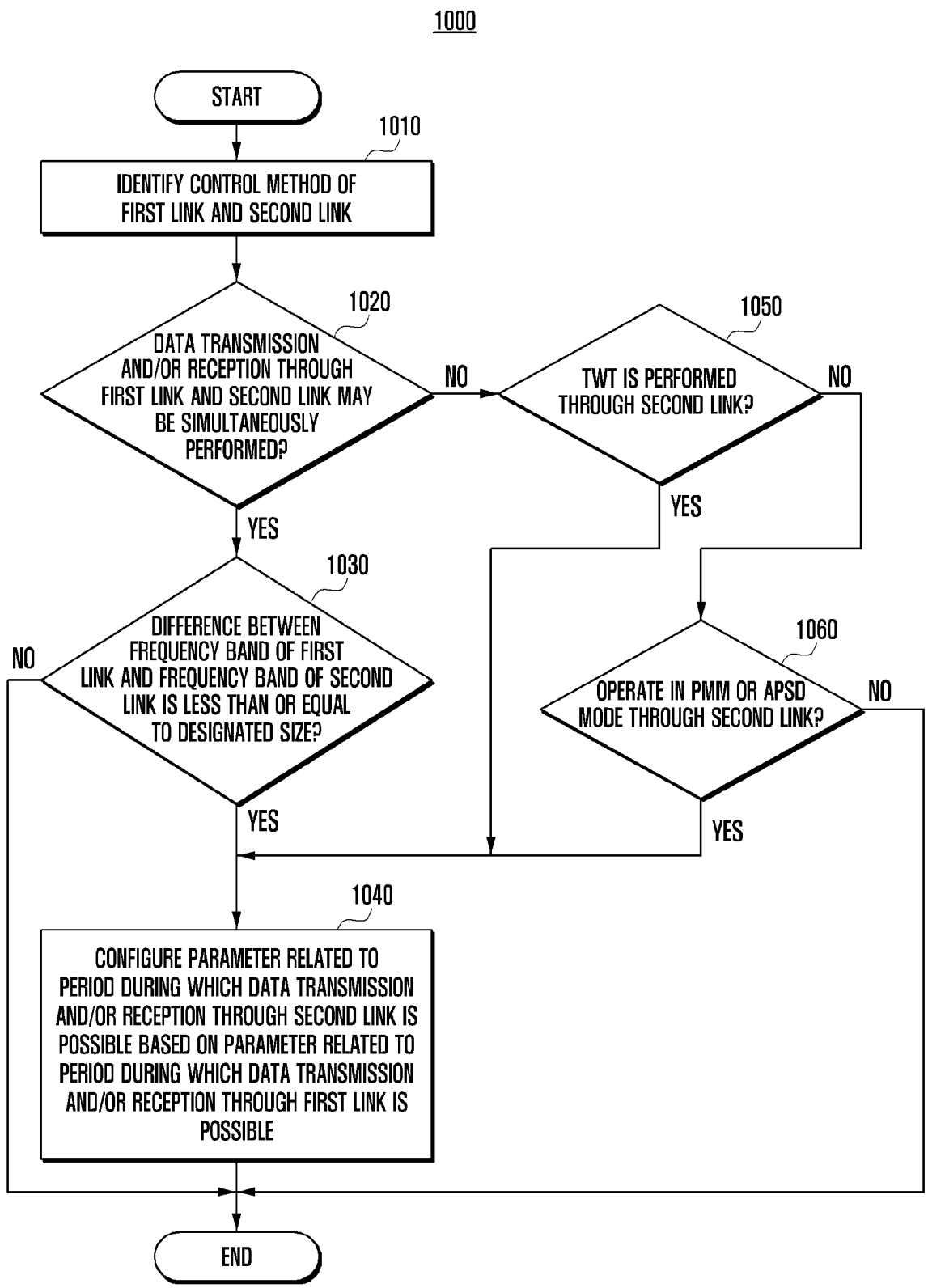
FIG. 10 is a flowchart illustrating a method of operating an electronic device according to various example embodiments.

FIG. 10 is a flowchart illustrating a method 900 of operating an electronic device according to various example embodiments.

In operation 1010, the electronic device (e.g., the electronic device 500 of FIG. 5) may identify a control method of a first link (e.g., the first link 341 of FIG. 3) and/or a second link (e.g., the second link 343 of FIG. 3).

The control method of the first link 341 and/or the second link 343 may be one method of an RSDB, VSDB, and/or SCC.

In operation 1020, the electronic device 500 may identify whether performing an operation of transmitting and/or receiving data through the first link 341 and the second link 343.

The electronic device 500 may identify whether the control method of the first link 341 and/or the second link 343 may simultaneously perform an operation of transmitting and/or receiving data through the first link 341 and an operation of transmitting and/or receiving data through the second link 343.

According to an embodiment, the electronic device 500 may control the first link 341 and/or the second link 343 using a function (e.g., real simultaneous dual band (RSDB)) capable of simultaneously performing transmission and/or reception of signals through at least two frequency bands of a plurality of frequency bands. In case that the electronic device 500 supports an RSDB, the first link 341 used for data exchange between the first external electronic device 320 and the electronic device 500 the second link 343 used for data exchange between the second external electronic device 330 and the electronic device 500 may have different frequency bands (or different channel numbers). The electronic device 500 may transmit or receive data through the second link 343 while transmitting or receiving data through the first link 341. The electronic device 500 may determine that the control method of the first link 341 and/or the second link 343 may simultaneously perform an operation of transmitting and/or receiving data through the first link 341 and an operation of transmitting and/or receiving data through the second link 343.

According to another embodiment, even if the electronic device 500 supports an RSDB, the electronic device 500 may determine that an operation of transmitting and/or receiving data through the first link 341 and an operation of transmitting and/or receiving data through the second link 343 may not be simultaneously performed corresponding to identifying that a frequency band of the first link 341 and/or a frequency band of the second link 343 are/is less than or equal to a designated value. A situation in which a frequency band of the first link 341 and/or a frequency band of the second link 343 are/is less than or equal to a designated value may indicate a situation in which a signal transmitted or received through the first link 341 acts as interference to interrupt transmission and/or reception of a signal through the second link 343.

According to another embodiment, the electronic device 500 may control the first link 341 and/or the second link 343 using a function (e.g., virtual simultaneous dual band (VSDB)) capable of performing transmission and/or reception of signals through at least two frequency bands of a plurality of frequency bands at different times. In case that the electronic device 500 supports the VSDB, the first link 341 used for data exchange between the first external electronic device 320 and the electronic device 500 and the second link 343 used for data exchange between the second external electronic device 330 and the electronic device 500 may have different frequency bands (or different channel numbers). However, the electronic device 500 may not transmit or receive data through the second link 343 while transmitting or receiving data through the first link 341. The electronic device 500 may determine that the control method of the first link 341 and/or the second link 343 may not perform simultaneously an operation of transmitting and/or receiving data through the first link 341 and an operation of transmitting and/or receiving data through the second link 343.

According to another embodiment, the electronic device 500 may control the first link 341 and/or the second link 343 using a function (e.g., single channel concurrent (SCC)) of transmitting or receiving data to or from external electronic devices (e.g., the first external electronic device 320 and/or the second external electronic device 330) through the same channel. In case that the electronic device 500 supports SCC, the first link 341 used for data exchange between the first external electronic device 320 and the electronic device 500 and the second link 343 used for data exchange between the second external electronic device 330 and the electronic device 500 may have the same channel number. However, the electronic device 310 may not transmit or receive data through the second link 343 while transmitting or receiving data through the first link 341. The electronic device 500 may determine that the control method of the first link 341 and/or the second link 343 may not perform simultaneously an operation of transmitting and/or receiving data through the first link 341 and an operation of transmitting and/or receiving data through the second link 343.

In operation 1030, the electronic device 500 may identify whether a difference between the frequency band of the first link 341 and the frequency band of the second link 343 is less than or equal to a designated value corresponding to identifying (operation 1020-Y) that the control method of the first link 341 and/or the second link 343 may perform simultaneously data transmission and/or reception through the first link 341 and the second link 343.

The electronic device 500 may determine that an operation of transmitting and/or receiving data through the first link 341 and an operation of transmitting and/or receiving data through the second link 343 may not be simultaneously performed corresponding to identifying that a difference between the frequency band of the first link 341 and/or the frequency band of the second link 343 is less than or equal to a designated value (operation 1030-Y). A situation in which the frequency band of the first link 341 and/or the frequency band of the second link 343 are/is less than or equal to a designated value may indicate a situation in which a signal transmitted or received through the first link 341 acts as interference to interrupt transmission and/or reception of a signal through the second link 343.

In operation 1040, the electronic device 500 may configure at least one parameter related to a period during which data transmission and/or reception through the second link 343 is possible based on at least one parameter related to a period during which data transmission and/or reception through the first link 341 is possible corresponding to identifying that a difference between the frequency band of the first link 341 and/or the frequency band of the second link 343 is less than or equal to a designated value (operation 1030-Y).

As part of an operation of scheduling data transmission and/or reception through the second link 343, the electronic device 500 may configure at least one parameter related to a period during which data transmission and/or reception through the second link 343 is possible so that a period during which data transmission and/or reception through the first link 341 is possible and a period during which data transmission and/or reception through the second link 343 is possible do not overlap (or so that a length of an overlapping period is less than or equal to a designated size). The electronic device 500 does not simultaneously perform an operation of transmitting and/or receiving data through the first link 341 and an operation of transmitting and/or receiving data through the second link 343 through the above method, thereby reducing latency of data transmission and/or reception.

In operation 1050, the electronic device 500 may identify whether a TWT is performed through the second link 343 corresponding to identifying that the control method of the first link 341 and/or the second link 343 does not perform simultaneously data transmission and/or reception through the first link 341 and the second link 343 (operation 1020-N).

A parameter related to a period during which data transmission and/or reception through the first link 341 is possible may include a TWT parameter in case that the first link 341 performs a TWT. The TWT parameter may include at least one of a target wake time (e.g., 411 of FIG. 4A) indicating an activation time point of data transmission and/or reception, TWT duration (e.g., 412-a, 412-b, and 412-c of FIG. 4A) indicating a period that may perform data transmission and/or reception, and/or a TWT wake interval (e.g., 413-a and 413-b of FIG. 4A) indicating an interval between an activation time point of data transmission and/or reception and a next activation time point of data transmission and/or reception.

The electronic device 500 may receive a TWT request message transmitted by the first external electronic device 320 and identify parameters related to a period during which data transmission and/or reception through the first link 341 is possible based on the TWT parameter included in the TWT request message.

In operation 1040, the electronic device 500 may configure at least one parameter related to a period during which data transmission and/or reception through the second link 343 is possible based on at least one parameter related to a period during which data transmission and/or reception through the first link 341 is possible corresponding to identifying that a TWT is performed through the second link 343 (operation 1050-Y).

As part of a scheduling operation of the second link 343, the electronic device 500 may configure TWT duration and a TWT interval of the second link 343 so that TWT duration of the first link 341 and TWT duration of the second link 343 do not overlap each other (or so that a length of an overlapping period is less than or equal to a designated length).

In operation 1060, the electronic device 500 may identify whether the electronic device 500 operates in a PMM or APSD mode through the second link 343 corresponding to identifying that the electronic device 500 does not perform a TWT through the second link 343 (operation 1050-N).

In operation 1040, the electronic device 500 may configure at least one parameter related to a period during which data transmission and/or reception through the second link 343 is possible based on at least one parameter related to a period during which data transmission and/or reception through the first link 341 is possible corresponding to identifying that a PMM or APSD mode is performed through the second link 343 (operation 1060-Y).

In case that the electronic device 500 performs a TWT through the first link 341 and operates in a PMM (or APSD) mode through the second link 343, as part of a scheduling operation of the second link 343, the electronic device 500 may control the communication circuit 510 to transmit a signal (e.g., 421 of FIG. 4B) instructing to perform data transmission and/or reception through the second link 343 so that a period during which data transmission and/or reception through the first link 341 is possible and a period during which data transmission and/or reception through the second link 343 is possible do not overlap (or so that a length of an overlapping period is less than or equal to a designated length). A method of operating an electronic device according to various example embodiments may include identifying a control method of a first link used for transmitting and receiving data to and from a first external electronic device while the electronic device operates in a soft AP mode and a second link used for transmitting and receiving data to and from a second external electronic device while the electronic device operate in an STA mode; and configuring at least one parameter related to a period during which data transmission and/or reception through the second link is possible based on at least one parameter related to a period during which data transmission and/or reception through the first link is possible corresponding to identifying that the control method does not simultaneously perform data transmission and/or reception through the first link and the second link.

In a method of operating an electronic device according to various example embodiments, configuring at least one parameter may include configuring at least one parameter related to a period during which data transmission and/or reception through the second link is possible so that a period during which data transmission and/or reception through the first link is performed and a period during which data transmission and/or reception through the second link is performed do not overlap.

In a method of operating an electronic device according to various example embodiments, the configuring the at least one parameter may include configuring TWT duration and an TWT interval so that a period during which data transmission and/or reception through the first link is performed and the TWT duration do not overlap in case that a target wake time (TWT) is performed through the second link.

A method of operating an electronic device according to various example embodiments may further include transmitting a signal instructing to perform data transmission and/or reception through the second link so that a period for performing data transmission and/or reception through the first link and a period for performing data transmission and/or reception through the second link do not overlap in case of operating in a power management mode or an automatic power save delivery (APSD) mode through the second link.

A method of operating an electronic device according to various example embodiments may further include transmitting a signal indicating that data transmission and/or reception through the second link is completed before a period for performing data transmission and/or reception through the first link begins.

A method of operating an electronic device according to various example embodiments may further include at least one operation for ending a period for performing data transmission and/or reception through the first link and transmitting a signal instructing to perform data transmission and/or reception through the second link corresponding to completion of data transmission and/or reception through the first link during a period for performing data transmission and/or reception through the first link.

In a method of operating an electronic device according to various example embodiments, a signal instructing to perform data transmission and/or reception through the second link may include length information of a period during which data transmission and/or reception through the second link is performed.

A method of operating an electronic device according to various example embodiments may further include determining at least one parameter related to a period during which data transmission and/or reception through the first link is possible based on a size of data transmitted or received to or from the first external electronic device and/or a modulation and coding scheme (MCS) of the first link.

A method of operating an electronic device according to various example embodiments may further include identifying a difference between a frequency band of the first link and a frequency band of the second link corresponding to identifying that the control method simultaneously performs data transmission and/or reception through the first link and the second link; and configuring at least one parameter related to a period during which data transmission and/or reception through the second link is possible based on at least one parameter related to a period during which data transmission and/or reception through the first link is possible corresponding to identifying that the difference is greater than or equal to a designated value.

In a method of operating an electronic device according to various example embodiments, the control method of the first link and the second link may include one control method of a real simultaneous dual band (RSDB), a virtual simultaneous dual band (VSDB), and/or single channel concurrent (SCC).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 and/or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a communication circuit configured to transmit and receive data to and from a first external electronic device through a first link of short-range wireless communication while the electronic device operates in a soft AP mode and to transmit and receive data to and from a second external electronic device through a second link of the short-range wireless communication while the electronic device operates in an STA mode; and
a processor,
wherein the processor is configured to:
identify a control technique of the first link and the second link, and
configure at least one parameter related to a period during which data transmission and/or reception through the second link is available based on at least one parameter related to a period during which data transmission and/or reception through the first link is available corresponding to identification that the control technique does not simultaneously perform data transmission and/or reception through the first link and the second link.

2. The electronic device of claim 1, wherein the processor is configured to configure at least one parameter related to a period during which data transmission and/or reception through the second link is available so that a period for performing data transmission and/or reception through the first link and a period for performing data transmission and/or reception through the second link do not overlap.

3. The electronic device of claim 1, wherein the processor is configured to configure target wake time (TWT) duration and a TWT interval so that the TWT duration and a period for performing data transmission and/or reception through the first link do not overlap in case that a TWT is to be performed through the second link.

4. The electronic device of claim 1, wherein the processor is configured to control to transmit a signal instructing to perform data transmission and/or reception through the second link so that a period for performing data transmission and/or reception through the first link and a period for performing data transmission and/or reception through the second link do not overlap in case for operating in a power management mode or automatic power save delivery (APSD) mode through the second link.

5. The electronic device of claim 4, wherein the processor is configured to control to transmit a signal instructing completion of data transmission and/or reception through the second link before a period for performing data transmission and/or reception through the first link begins.

6. The electronic device of claim 4, wherein the processor is configured to control to transmit a signal instructing to perform at least one operation for ending a period performing data transmission and/or reception through the first link and data transmission and/or reception through the second link corresponding to completion of data transmission and/or reception through the first link during a period for performing data transmission and/or reception through the first link.

7. The electronic device of claim 4, wherein the signal instructing to perform data transmission and/or reception through the second link comprises length information of a period for performing data transmission and/or reception through the second link.

8. The electronic device of claim 1, wherein the processor is configured to determine at least one parameter related to a period during which data transmission and/or reception through the first link is available based on a size of data transmitted and/or received to and/or from the first external electronic device and/or a modulation and coding scheme (MCS) of the first link.

9. The electronic device of claim 1, wherein the processor is configured to:
identify a difference between a frequency band of the first link and a frequency band of the second link corresponding to identifying that the control technique simultaneously performs data transmission and/or reception through the first link and the second link, and
configure at least one parameter related to a period during which data transmission and/or reception through the second link is available based on at least one parameter related to a period during which data transmission and/or reception through the first link is available corresponding to identifying that the difference is greater than or equal to a designated value.

10. The electronic device of claim 1, wherein the control technique of the first link and the second link comprises at least one control technique amongst: a real simultaneous dual band (RSDB), a virtual simultaneous dual band (VSDB), and/or single channel concurrent (SCC).

11. The electronic device of claim 1, wherein the processor is a processor implemented within the communication circuit.

12. The electronic device of claim 1, wherein the processor is an application processor.

13. A method of operating an electronic device, the method comprising:
identifying a control method of a first link used for transmitting and receiving data to and from a first external electronic device while the electronic device operates in a soft AP mode and a second link used for transmitting and receiving data to and from a second external electronic device while the electronic device operates in an STA mode; and
configuring at least one parameter related to a period during which data transmission and/or reception through the second link is possible based on at least one parameter related to a period during which data transmission and/or reception through the first link is possible corresponding to identifying that the control method does not simultaneously perform data transmission and/or reception through the first link and the second link.

14. The method of claim 13, wherein configuring at least one parameter comprises configuring at least one parameter related to a period during which data transmission and/or reception through the second link is possible so that a period for performing data transmission and/or reception through the first link and a period for performing data transmission and/or reception through the second link do not overlap.

15. The method of claim 13, wherein configuring at least one parameter comprises configuring TWT duration and a TWT interval so that a period for performing data transmission and/or reception through the first link and the TWT duration do not overlap when performing a target wake time (TWT) through the second link.

16. The method of claim 13, further comprising transmitting a signal instructing to perform data transmission and/or reception through the second link so that a period for performing data transmission and/or reception through the first link and a period for performing data transmission and/or reception through the second link do not overlap when operating in a power management mode or an automatic power save delivery (APSD) mode through the second link.

17. The method of claim 16, further comprising transmitting a signal instructing completion of data transmission and/or reception through the second link before a period for performing data transmission and/or reception through the first link begins.

18. The method of claim 16, further comprising performing at least one operation for ending a period for performing data transmission and/or reception through the first link and transmitting a signal instructing to perform data transmission and/or reception through the second link corresponding to completion of data transmission and/or reception through the first link during a period for performing data transmission and/or reception through the first link.

19. The method of claim 16, wherein the signal instructing to perform data transmission and/or reception through the second link comprises length information of a period for performing data transmission and/or reception through the second link.

20. The method of claim 13, further comprising determining at least one parameter related to a period during which data transmission and/or reception through the first link is possible based on a size of data transmitted or received to or from the first external electronic device and/or a modulation and coding scheme (MCS) of the first link.

* * * * *